(12) United States Patent
Joshi et al.

(10) Patent No.: US 11,209,536 B2
(45) Date of Patent: Dec. 28, 2021

(54) METHOD AND APPARATUS FOR TRACKING MOTION USING RADIO FREQUENCY SIGNALS

(71) Applicant: THE BOARD OF TRUSTEES OF THE LELAND STANFORD JUNIOR UNIVERSITY, Palo Alto, CA (US)

(72) Inventors: Kiran Joshi, Sunnyvale, CA (US); Dinesh Bharadia, Menlo Park, CA (US); Sachin Katti, Stanford, CA (US); Manikanta Kotaru, Stanford, CA (US)

(73) Assignee: THE BOARD OF TRUSTEES OF THE LELAND STANFORD JUNIOR UNIVERSITY, Palo Alto, CA (US)

(*) Notice: Subject to any disclaimer, the term of this patent is extended or adjusted under 35 U.S.C. 154(b) by 379 days.

(21) Appl. No.: 15/307,721

(22) PCT Filed: May 4, 2015

(86) PCT No.: PCT/US2015/029105
§ 371 (c)(1),
(2) Date: Oct. 28, 2016

(87) PCT Pub. No.: WO2015/168700
PCT Pub. Date: Nov. 5, 2015

(65) Prior Publication Data
US 2017/0090026 A1 Mar. 30, 2017

Related U.S. Application Data

(60) Provisional application No. 61/987,790, filed on May 2, 2014.

(51) Int. Cl.
*G01S 13/56* (2006.01)
*G01S 13/538* (2006.01)
*G01S 13/87* (2006.01)

(52) U.S. Cl.
CPC ............ *G01S 13/56* (2013.01); *G01S 13/538* (2013.01); *G01S 13/87* (2013.01)

(58) Field of Classification Search
CPC .................................. G01S 13/56; G01S 13/87
(Continued)

(56) References Cited

U.S. PATENT DOCUMENTS 3,852,742 A * 12/1974 Fletcher, Jr. .......... G01S 13/526
342/162
3,922,617 A 11/1975 Denniston
(Continued)

FOREIGN PATENT DOCUMENTS

EP      0755141 A2    1/1997
EP      1959625 B1    2/2009
(Continued)

OTHER PUBLICATIONS

Adib et al., "See Through Walls with Wi-Fi!," Proceedings of the ACM SIGCOMM 2013 conference on SIGCOMM, SIGCOMM '13, pp. 75-86, ACM, New York, NY, USA, (2013).
(Continued)

*Primary Examiner* — Bernarr E Gregory
*Assistant Examiner* — Nuzhat Pervin
(74) *Attorney, Agent, or Firm* — Alston & Bird LLP

(57) ABSTRACT

Techniques for a motion tracing device using radio frequency signals are presented. The motion tracing device utilizes radio frequency signals, such as WiFi to identify moving objects and trace their motion. Methods and apparatus are defined that can measure multiple WiFi backscatter signals and identify the backscatter signals that correspond to moving objects. In addition, motion of a plurality of moving objects can be detected and traced for a predefined duration of time.

17 Claims, 13 Drawing Sheets

(58) Field of Classification Search
USPC .......................................................... 342/28
See application file for complete search history.

(56) References Cited

U.S. PATENT DOCUMENTS

| | | | | |
|---|---|---|---|---|
| 4,053,885 A * | 10/1977 | Tomita | ................ | G01S 13/5246 |
| | | | | 342/162 |
| 4,173,017 A * | 10/1979 | Burlage | .................. | G01S 13/52 |
| | | | | 342/162 |
| 4,287,579 A * | 9/1981 | Inoue | ...................... | G01S 13/56 |
| | | | | 340/554 |
| 4,324,258 A * | 4/1982 | Huebscher | ................ | A61B 8/06 |
| | | | | 600/455 |
| 4,885,590 A * | 12/1989 | Hasan | .................. | G01S 13/528 |
| | | | | 342/196 |
| 4,952,193 A | 8/1990 | Talwar | | |
| 5,061,934 A * | 10/1991 | Brown | ................. | G06K 9/3241 |
| | | | | 342/162 |
| 5,188,112 A * | 2/1993 | Sturgill | .................. | A61B 8/488 |
| | | | | 600/455 |
| 5,212,827 A | 5/1993 | Meszko et al. | | |
| 5,444,864 A | 8/1995 | Smith | | |
| 5,691,978 A | 11/1997 | Kenworthy | | |
| 5,734,967 A | 3/1998 | Kotzin et al. | | |
| 5,790,658 A | 8/1998 | Yip et al. | | |
| 5,818,383 A * | 10/1998 | Stockburger | ........ | G01S 13/9029 |
| | | | | 342/109 |
| 5,883,597 A * | 3/1999 | DeWulf | .................. | G01S 19/36 |
| | | | | 342/357.72 |
| 5,930,301 A | 7/1999 | Chester et al. | | |
| 6,069,583 A * | 5/2000 | Silvestrin | ................ | G01S 19/29 |
| | | | | 342/357.27 |
| 6,198,427 B1 * | 3/2001 | Aker | ........................ | G01S 7/04 |
| | | | | 342/104 |
| 6,215,812 B1 | 4/2001 | Young et al. | | |
| 6,400,306 B1 * | 6/2002 | Nohara | ............... | G01S 13/5244 |
| | | | | 342/160 |
| 6,411,250 B1 | 6/2002 | Oswald et al. | | |
| 6,498,581 B1 * | 12/2002 | Yu | ............................. | G01S 3/74 |
| | | | | 342/147 |
| 6,539,204 B1 | 3/2003 | Marsh et al. | | |
| 6,567,649 B2 | 5/2003 | Souissi | | |
| 6,639,551 B2 | 10/2003 | Li et al. | | |
| 6,725,017 B2 | 4/2004 | Blount et al. | | |
| 6,745,018 B1 | 6/2004 | Zehavi et al. | | |
| 6,965,657 B1 | 11/2005 | Rezvani et al. | | |
| 7,215,976 B2 | 5/2007 | Brideglall | | |
| 7,336,940 B2 | 2/2008 | Smithson | | |
| 7,349,505 B2 | 3/2008 | Blount et al. | | |
| 7,362,257 B2 * | 4/2008 | Bruzzone | ................ | G01S 7/021 |
| | | | | 342/13 |
| 7,426,242 B2 | 9/2008 | Thesling | | |
| 7,460,615 B2 * | 12/2008 | Kunysz | ................... | G01S 19/32 |
| | | | | 342/352 |
| 7,564,396 B2 | 7/2009 | Van Veldhoven et al. | | |
| 7,869,527 B2 | 1/2011 | Vetter et al. | | |
| 8,005,235 B2 | 8/2011 | Gupta et al. | | |
| 8,060,803 B2 | 11/2011 | Kim | | |
| 8,086,191 B2 | 12/2011 | Fukuda et al. | | |
| 8,155,595 B2 | 4/2012 | Sahin et al. | | |
| 8,175,535 B2 | 5/2012 | Mu | | |
| 8,179,990 B2 | 5/2012 | Orlik et al. | | |
| 8,218,697 B2 | 7/2012 | Guess et al. | | |
| 8,242,888 B2 * | 8/2012 | Tuttle | ....................... | G01S 11/10 |
| | | | | 340/10.1 |
| 8,279,112 B2 * | 10/2012 | Carrick | ................ | G06K 7/0008 |
| | | | | 342/127 |
| 8,331,477 B2 | 12/2012 | Huang et al. | | |
| 8,351,533 B2 | 1/2013 | Shrivastava et al. | | |
| 8,385,871 B2 | 2/2013 | Wyville | | |
| 8,422,540 B1 | 4/2013 | Negus et al. | | |
| 8,633,805 B2 * | 1/2014 | Tuttle | ................ | G06K 7/10366 |
| | | | | 340/10.1 |
| 8,755,756 B1 | 6/2014 | Zhang et al. | | |
| 8,830,123 B2 * | 9/2014 | Rao | ........................ | G01S 19/33 |
| | | | | 342/357.63 |
| 8,995,410 B2 | 3/2015 | Balan et al. | | |
| 9,042,838 B2 | 5/2015 | Braithwaite | | |
| 9,054,795 B2 | 6/2015 | Choi et al. | | |
| 9,065,519 B2 | 6/2015 | Cyzs et al. | | |
| 9,077,421 B1 | 7/2015 | Mehlman et al. | | |
| 9,124,475 B2 | 9/2015 | Li et al. | | |
| 9,184,902 B2 | 11/2015 | Khojastepour et al. | | |
| 9,246,554 B2 | 1/2016 | Maguire | | |
| 9,269,144 B2 * | 2/2016 | Kraus | .................. | A61B 3/0025 |
| 9,325,432 B2 | 4/2016 | Hong et al. | | |
| 9,357,341 B2 | 5/2016 | Deyle | | |
| 9,367,711 B1 | 6/2016 | Dacus et al. | | |
| 9,441,966 B2 * | 9/2016 | Ruizenaar | ............. | G01C 19/00 |
| 9,887,728 B2 | 2/2018 | Jain et al. | | |
| 9,927,519 B1 * | 3/2018 | Omer | .................... | G01S 13/003 |
| 10,338,205 B2 | 7/2019 | Zhang et al. | | |
| 10,902,227 B2 * | 1/2021 | Nikitin | ............... | G06K 7/10108 |
| 2002/0064245 A1 | 5/2002 | McCorkle | | |
| 2003/0031279 A1 | 2/2003 | Blount et al. | | |
| 2003/0053659 A1 * | 3/2003 | Pavlidis | .................. | G06K 9/38 |
| | | | | 382/103 |
| 2003/0099287 A1 | 5/2003 | Arambepola | | |
| 2003/0148748 A1 | 8/2003 | Shah | | |
| 2004/0106381 A1 | 6/2004 | Tiller | | |
| 2005/0078743 A1 | 4/2005 | Shohara | | |
| 2005/0129152 A1 | 6/2005 | Hillstrom | | |
| 2005/0159128 A1 | 7/2005 | Collins et al. | | |
| 2005/0190870 A1 | 9/2005 | Blount et al. | | |
| 2005/0254555 A1 | 11/2005 | Teague | | |
| 2005/0282500 A1 | 12/2005 | Wang et al. | | |
| 2006/0029124 A1 | 2/2006 | Grant et al. | | |
| 2006/0030277 A1 | 2/2006 | Cyr et al. | | |
| 2006/0044147 A1 * | 3/2006 | Knox | ........................ | G01S 5/12 |
| | | | | 340/686.1 |
| 2006/0058022 A1 | 3/2006 | Webster et al. | | |
| 2006/0083297 A1 | 4/2006 | Yan et al. | | |
| 2006/0209754 A1 | 9/2006 | Ji et al. | | |
| 2007/0003141 A1 * | 1/2007 | Rittscher | ............ | G06K 9/00778 |
| | | | | 382/181 |
| 2007/0018722 A1 | 1/2007 | Jaenecke | | |
| 2007/0105509 A1 | 5/2007 | Muhammad et al. | | |
| 2007/0171119 A1 * | 7/2007 | Dwelly | .................... | G01S 13/56 |
| | | | | 342/28 |
| 2007/0207747 A1 | 9/2007 | Johnson et al. | | |
| 2007/0223617 A1 | 9/2007 | Lee et al. | | |
| 2007/0249314 A1 | 10/2007 | Sanders et al. | | |
| 2007/0274372 A1 | 11/2007 | Asai et al. | | |
| 2008/0004796 A1 * | 1/2008 | Schott | .................. | G01C 21/005 |
| | | | | 701/434 |
| 2008/0037801 A1 | 2/2008 | Alves et al. | | |
| 2008/0089397 A1 | 4/2008 | Vetter et al. | | |
| 2008/0107046 A1 | 5/2008 | Kangasmaa et al. | | |
| 2008/0129581 A1 * | 6/2008 | Douglass | ............... | G01S 13/34 |
| | | | | 342/52 |
| 2008/0129584 A1 * | 6/2008 | Antonik | .................. | G01S 13/87 |
| | | | | 342/25 B |
| 2008/0131133 A1 | 6/2008 | Blunt et al. | | |
| 2008/0192636 A1 | 8/2008 | Briscoe et al. | | |
| 2008/0219339 A1 | 9/2008 | Chrabieh et al. | | |
| 2008/0219377 A1 | 9/2008 | Nisbet | | |
| 2008/0255911 A1 * | 10/2008 | Khosla | .................. | G01S 5/0294 |
| | | | | 705/7.38 |
| 2009/0022089 A1 | 1/2009 | Rudrapatna | | |
| 2009/0034437 A1 | 2/2009 | Shin et al. | | |
| 2009/0047914 A1 | 2/2009 | Axness et al. | | |
| 2009/0115912 A1 | 5/2009 | Liou et al. | | |
| 2009/0147837 A1 | 6/2009 | Lau | | |
| 2009/0180404 A1 | 7/2009 | Jung et al. | | |
| 2009/0186582 A1 | 7/2009 | Muhammad et al. | | |
| 2009/0221231 A1 | 9/2009 | Weng et al. | | |
| 2009/0262005 A1 * | 10/2009 | McNeill | ............... | G01S 13/9029 |
| | | | | 342/22 |
| 2009/0303004 A1 * | 12/2009 | Tuttle | .................. | G06K 7/10366 |
| | | | | 340/10.1 |
| 2009/0303908 A1 | 12/2009 | Deb et al. | | |
| 2009/0305650 A1 | 12/2009 | Wenger et al. | | |

(56) References Cited

U.S. PATENT DOCUMENTS

| | | |
|---|---|---|
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Yeh et al. |
| 2010/0117693 A1 | 5/2010 | Lorg et al. |
| 2010/0136900 A1 | 6/2010 | Seki |
| 2010/0150033 A1 | 6/2010 | Zinser et al. |
| 2010/0152600 A1* | 6/2010 | Droitcour ............ A61B 5/1114 600/534 |
| 2010/0159837 A1 | 6/2010 | Dent et al. |
| 2010/0159858 A1 | 6/2010 | Dent et al. |
| 2010/0215124 A1 | 8/2010 | Zeong et al. |
| 2010/0226416 A1 | 9/2010 | Dent et al. |
| 2010/0226448 A1* | 9/2010 | Dent ................... H04L 27/2647 375/260 |
| 2010/0232324 A1 | 9/2010 | Radunovic et al. |
| 2010/0240999 A1* | 9/2010 | Droitcour ............ A61B 5/7203 600/453 |
| 2010/0249630 A1* | 9/2010 | Droitcour ............ A61B 5/1113 600/529 |
| 2010/0249633 A1* | 9/2010 | Droitcour ............... G01S 13/88 600/534 |
| 2010/0279602 A1 | 11/2010 | Larsson et al. |
| 2010/0292568 A1* | 11/2010 | Droitcour ............ A61B 5/7221 600/425 |
| 2010/0295716 A1 | 11/2010 | Yamaki et al. |
| 2011/0013684 A1 | 1/2011 | Semenov et al. |
| 2011/0026509 A1 | 2/2011 | Tanaka |
| 2011/0080264 A1* | 4/2011 | Clare ...................... G01S 13/82 340/10.1 |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0243202 A1* | 10/2011 | Lakkis ................... H04B 1/525 375/219 |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0032843 A1* | 2/2012 | Lee ......................... G01S 19/48 342/357.31 |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0161931 A1 | 6/2012 | Karmakar et al. |
| 2012/0201153 A1 | 8/2012 | Bharadia et al. |
| 2012/0201173 A1 | 8/2012 | Jain et al. |
| 2012/0268253 A1* | 10/2012 | Tuttle ..................... G01S 11/10 340/10.1 |
| 2012/0309454 A1* | 12/2012 | Maguire ............... H04W 8/005 455/557 |
| 2012/0319819 A1* | 12/2012 | Tkachenko ........... G01S 13/878 340/10.1 |
| 2012/0321006 A1 | 12/2012 | Akita et al. |
| 2013/0005284 A1 | 1/2013 | Dalipi |
| 2013/0044791 A1 | 2/2013 | Rimini et al. |
| 2013/0089009 A1 | 4/2013 | Li et al. |
| 2013/0102254 A1 | 4/2013 | Cyzs et al. |
| 2013/0113647 A1* | 5/2013 | Sentelle ................ G01S 13/887 342/22 |
| 2013/0114468 A1 | 5/2013 | Hui et al. |
| 2013/0155913 A1 | 6/2013 | Sarca |
| 2013/0166259 A1 | 6/2013 | Weber et al. |
| 2013/0194419 A1* | 8/2013 | Bhowmick ............ H04N 7/188 348/142 |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0301487 A1 | 11/2013 | Khandani |
| 2013/0301488 A1 | 11/2013 | Hong et al. |
| 2014/0126437 A1 | 5/2014 | Patil et al. |
| 2014/0169236 A1 | 6/2014 | Choi et al. |
| 2014/0206300 A1 | 7/2014 | Hahn et al. |
| 2014/0219139 A1 | 8/2014 | Choi et al. |
| 2014/0301379 A1 | 10/2014 | Shoarinejad |
| 2014/0348018 A1 | 11/2014 | Bharadia et al. |
| 2015/0091706 A1 | 4/2015 | Chemishkian et al. |
| 2015/0156003 A1 | 6/2015 | Khandani |
| 2015/0156004 A1 | 6/2015 | Khandani |
| 2016/0226653 A1 | 8/2016 | Bharadia et al. |
| 2016/0234005 A1 | 8/2016 | Hong et al. |
| 2016/0266245 A1 | 9/2016 | Bharadia et al. |
| 2017/0264420 A1 | 9/2017 | Bharadia et al. |
| 2019/0274144 A1 | 9/2019 | Zhang et al. |

FOREIGN PATENT DOCUMENTS

| | | | |
|---|---|---|---|
| EP | 2237434 A1 | 10/2010 | |
| EP | 2267946 A2 | 12/2010 | |
| JP | 2001-196994 A | 7/2001 | |
| JP | 2004-56315 A | 2/2004 | |
| RU | 2256985 C2 | 7/2005 | |
| WO | WO 2009/106515 A1 | 9/2009 | |
| WO | WO-2010132850 A1 * | 11/2010 | ............. A61B 5/165 |
| WO | WO 2012/106262 A1 | 8/2012 | |
| WO | WO 2012/106263 A1 | 8/2012 | |
| WO | WO 2013/185106 A1 | 12/2013 | |
| WO | WO 2014/093916 A1 | 6/2014 | |
| WO | WO 2014/121290 A1 | 8/2014 | |
| WO | WO 2015/021481 A2 | 2/2015 | |
| WO | WO 2015/048678 A1 | 4/2015 | |
| WO | WO 2015073905 A2 | 5/2015 | |
| WO | WO 2015/168700 A1 | 11/2015 | |
| WO | WO 2017/132400 A1 | 8/2017 | |

OTHER PUBLICATIONS

Adib, et al., "3D Tracking via Body Radio Reflections," Proceedings of the 11th USENIX Symposium on Networked Systems Design and Implementation, pp. 317-329, (2014).

Archer, et al., "Interface Contracts for TinyOS," IPSN '07: Proceedings of the 6th international conference on Information processing in sensor networks, pp. 158-165 (2007).

Aryafar, et al., "MIDU: Enabling MIMO Full Duplex," Proceedings of the 18th annual international conference on Mobile computing and networking, Mobicom '12, pp. 257-268, (2012).

Bahl, et al., "Reconsidering Wireless Systems With Multiple Radios," ACM SIG-COMM CCR, (2004).

Bahl, et al., "White Space Networking with Wi-Fi like Connectivity," SIGCOMM Comput. Commun. Rev., 39(4):27-38, (2009).

Bardwell, "Tech Report." [Retrieved from the Internet Dec. 3, 2016: <http://www.connect802.com/download/techpubs/2005/commercial_radios_E052315.pdf>].

Bharadia et al., "Full Duplex Radios," In Proceedings of the ACM SIGCOMM 2013 conference on SIGCOMM, SIGCOMM '13, pp. 375-386, ACM, New York, NY, USA, (2013).

Bharadia, "Full Duplex Backscatter," Proceedings of the 12th ACM Workshop on Hot Topics in Networks, 7 pages, ACM, (2013).

Bicket, "Bit-rate Selection in Wireless Networks," Master's thesis, MIT, 2005.

Bindu et al., "Active microwave imaging for breast cancer detection," Progress in Electromagnetics Research, vol. 58: 149-169, (2006).

Blefari-Melazzi, et al., "TCP Fairness Issues in IEEE 802.11 Networks: Problem Analysis and Solutions Based on Rate Control," IEEE Transactions on Wireless Communications, 6(4): 1346-1355 (2007).

Bliss, et al., "Simultaneous Transmission and Reception for Improved Wireless Network Performance," Proceedings of the 2007 IEEE Workshop on Statistical Signal Processing, (2007).

(56) References Cited

OTHER PUBLICATIONS

Bortz, et al., "The Simplex Gradient and Noisy Optimization Problems," North Carolina State University, Department of Mathematics, Center for Research in Scientific Computation, (1998).
Boyd, "sequential Convex Programming." [Retrieved from the Internet Oct. 26, 2016: http://www.stanford.edu/class/ ee364b/lectures/seq_slides. pdf].
Briggs, et al., "Power Measurements of OFDM Signals," IEEE Symposium on Electromagnetic Compatibility, (2004).
Burlingame, et al., "An Analog CMOS High-Speed Continuous-Time FIR Filter," Solid-State Circuits Research Laboratory, Department of Electrical and Computer Engineering, University of California, Davis, CA, (2000).
Cavoukian, "Whole Body Imaging in Airport Scanners: Building in Privacy by Design," Information and Privacy Commissioner of Ontario, Mar. 2009. [Retrieved from the Internet Oct. 25, 2016: https://www.ipc.on.ca/wp-content/uploads/.../wholebodyimaging.pdf].
Chandra, "A Case for Adapting Channel Width in Wireless Networks," ACM SIGCOMM, (2008).
Choi, et al., "Granting Silence to Avoid Wireless Collisions," Proceedings of the 18th International Conference on Network Protocols (ICNP), (2010).
Choi, et al., "IEEE 802.11e Contention-Based Channel Access (EDCF) Performance Evaluation," IEEE ICC (2003).
Choi, et al., "The Case for a Network Protocol Isolation Layer," Sensys '09: Proceedings of the 7th ACM Conference on Embedded networked sensor systems (SenSys), pp. 267-280, (2009).
Chu, et al., "The Design and Implementation of a Declarative Sensor Network System," Proceedings of the 5th international conference on Embedded networked sensor systems, (2007).
Coffman, et al., "Channel Fragmentation in Dynamic Spectrum Access Systems—a Theoretical Study," ACM SIGMETRICS, (2010).
Culler, et al., "Towards a Sensor Network Architecture: Lowering the Waistline," Proceedings of the Tenth Workshop on Hot Topics in Operating Systems (HotOS-X), (2005).
Ding, "Digital Predistortion of Power Amplifiers for Wireless Applications," Ph.D Thesis, School of Electrical and Computer Engineering, Georgia Institute of Technology, (Mar. 2004).
Duate "Experiment-driven Characterzation of Full-Duplex Wireless Systems, " (2011). [Retrieved from the Internet Oct. 25, 2016: https://arxiv.org/abs/1107.1276].
Duarte, et al., "Full-Duplex Wireless Communications Using Off-The-Shelf Radios: Feasibility and First Results," Forty-Fourth Asilomar Conference on Signals, Systems, and Components, (2010).
Ekanadham, "Continuous Basis Pursuit and Its Applications," PhD thesis, New York, NY, USA, AAI3546394, (2012).
Elhamifar et al., "Sparse Subspace Clustering: Algorithm, Theory, and Applications, IEEE Transactions on Pattern Analysis and Machine Intelligence," 35(11):2765-2781, (2013).
Erceg et al., "TGn channel models," Tech. Rep. IEEE P802.11, Wireless LANs, Garden Grove, Calif, USA, (2004).
Ettus Research, UHD Daughterboard Application Notes. [Retrieved from the Internet Dec. 8, 2016: <http://files.ettus.com/uhd_docs/manual/html/dboards.html>].
Ettus Research, Universal Software Radio Peripheral (USRP). [Retrieved from the Internet Dec. 3, 2016: <http://www.ettus.com>].
Everett, et al., "Empowering Full-Duplex Wireless Communication by Exploiting Directional Diversity," 2011 Conference Record of the Forty Fifth Asilomar Conference on Signals, Systems and Computers, pp. 2002-2006, (Nov. 2011).
Everett, et al., "Passive Self-Interference Suppression for Full-Duplex Infrastructure Nodes," CoRR, abs/1302.2185, (2013).
FCC, Table of Frequency Allocations. [Retrieved from the Internet Dec. 3, 2016: <http://transition.fcc.gov/oet/spectrum/table/fcctable.pdf>].
FDA, "Medical Imaging," [Retrieved from the Internet Oct. 25, 2016: http://www.fda.gov/Radiation-EmittingProducts/RadiationEmittingProductsandProcedures/MedicalImaging/MedicalX-Rays/ucm115317.htm].
Fear et al., "Confocal Microwave Imaging for Breast Cancer Detection: Localization of Tumors in Three Dimensions," IEEE Transactions on Biomedical Engineering, 49(8):812-822, (2002).
Fear et al., "Microwave Detection of Breast Cancer," IEEE Transactions on Microwave Theory and Techniques, 48(11):1854-1863, (2000).
Fear, et al., "Enhancing breast tumor detection with near-field imaging," Microwave Magazine, IEEE, 3(1):48-56, (2002).
Fleury et al., "Channel Parameter Estimation in Mobile Radio Environments Using the SAGE Algorithm," IEEE Journal on Selected Areas in Communications, 17(3):434-450, (1999).
Gember, et al., "A Comparative Study of Handheld and Non-Handheld Traffic in Campus Wi-Fi Networks," Passive and Active Measurement Conf., (2011).
Gheorma, et al., "Rf Photonic Techniques for Same Frequency Simultaneous Duplex Antenna Operation," IEEE Photonics Technology Letters, 19(13): 1014-1016, (2007).
Gill, Slide Presentation: "RF performance of mobile terminals—a challenge for the industry," Cambridge Wireless Radio Technology Special Interest Group (SIG), (2011).
Gizmodo, "IPhone 4 Antenna-Gate," (2011). [Retrieved from the Internet Dec. 3, 2016: <http://gizmodo.com/5846638/giz-explains-whats-so-smart-about-the-iphone-4ss-antenna>].
Gnawali, et al., "Collection Tree Protocol," Proceedings of the 7th ACM Conference on Embedded Networked Sensor Systems (SenSys), pp. 1-14 (2009).
Goldsmith, "Wireless Communications," Cambridge University Press, (2004).
Gollakota, et al., "They Can Hear Your Heartbeats: Non-Invasive Security for Implantable Medical Devices," SIGCOMM Comput. Commun. Rev., 41(4), (Aug. 2011).
Gollakota, et al., "ZigZag Decoding: Combating Hidden Terminals in Wireless Networks," SIGCOMM '08: Proceedings of the ACM SIGCOMM 2008 Conference on Data Communication, pp. 159-170, (2008).
Gummadi, et al., "Understanding and Mitigating the Impact of RF Interference on 802.11 Networks," Proceedings of the 2007 conference on Applications, technologies, architectures, and protocols for computer communications (SIGCOMM), (2007).
Guo et al., "Microwave Imaging via Adaptive Beamforming Methods for Breast Cancer Detection," Progress in Electromagnetics Research, vol. 1, 350-353, (2005).
Halperin, et al., "Taking the Sting out of Carrier Sense: Interference Cancellation for Wireless LANs." MobiCom '08: Proceedings of the 14th ACM international conference on Mobile computing and networking, pp. 339-350, (2008).
Harashima, "Matched-Transmission Technique for Channels With Intersymbol Interference," IEEE Transactions on Communications, COM-20:774-780, (1972).
Hong et al., "Picasso: Flexible RF and Spectrum Slicing," In Proceedings of the ACM SIGCOMM 2012 conference on Applications, technologies, architectures, and protocols for computer communication, SIGCOMM '12, pp. 283-284, ACM, Helsinki, Finland, (2012).
Hong, et al, "DOF: A Local Wireless Information Plane," ACM SIGCOMM, (2011).
Hua, et al., "A method for Broadband Full-Duplex Mimo Radio," IEEE Signal Processing Letters, 19(12):793-796, (Dec. 2012).
Huang, "Optimal Transmission Strategies for Dynamic Spectrum Access in Cognitive Radio Networks," IEEE Transactions on Mobile Computing, 8(12): 1636-1648, (2009).
Huyer, et al., "SNOBFIT—Stable Noisy Optimization by Branch and Fit," ACM Trans. Math. Softw., 35:9:1-9:25, (Jul. 2008).
Intersil Corp, "Qhx220 Active Isolation Enhancer and Interference Canceller." [Retrieved from the Internet Dec. 6, 2016: <http://www.intersil.com/content/dam/Intersil/documents/qhx2/qhx220.pdf>].
Italian National Research Council, "Dielectric Properties of Body Tissues." [Retrieved from the Internet Oct. 25, 2016: http://niremf.ifac.cnr.it/tissprop/].
Iyer, et al., "Specnet: Spectrum Sensing Sans Frontiers," USENIX NSDI, (2011).
Jain et al., "Practical, Real-time, Full Duplex Wireless," MobiCom '11, pp. 301-312, ACM, New York, NY, USA, (2011).

(56) References Cited

OTHER PUBLICATIONS

Jamieson, et al., "PPR: Partial Packet Recovery for Wireless Networks," Proceedings of the 2007 conference on Applications, technologies, architectures, and protocols for computer communications (SIGCOMM), (2007).
Jiang, et al., "An Architecture for Energy Management in Wireless Sensor Networks," Proceedings of the International Workshop on Wireless Sensornet Architecture (WWSNA), (2007).
Joshi, et al., "Pinpoint: Localizing interfering radios," Proceedings of the 10th USENIX Conference on Networked Systems Design and Implementation, NSDI '13, pp. 241-254, (2013).
Jung, et al., "A Reconfigurable Carrier Leakage Canceler for UHF RFID Reader Front-Ends," IEEE Transactions on Circuits and Systems I: Regular Papers, 58(1):70-76, (Jan. 2011).
Khojastepour, et al., "The Case for Antenna Cancellation for Scalable Full Duplex Wireless Communications," ACM HOTNETS, (2011).
Kim, et al., "Co-Channel Interference Cancellation Using Single Radio Frequency and Baseband Chain," IEEE Transactions on Communications, 58(7):2169-2175, (2010).
Kim, et al., "Flush: A Reliable Bulk Transport Protocol for Multihop Wireless Networks," In Proceedings of the Fifth ACM Conference on Embedded networked sensor systems (SenSys), (2007).
Klues, et al., "Integrating Concurrency Control and Energy Management in Device Drivers," Proceedings of twenty-first ACM SIGOPS symposium on Operating systems principles (SOSP), (2007).
Knox, "Single Antenna Full Duplex Communications using a Common Carrier," 2012 IEEE 13th Annual Wireless and Microwave Technology Conference (WAMICON), pp. 1-6, (2012).
Kuhn, "The Hungarian Method for the Assignment Problem," Naval Research Logistics Quarterly 2, 2:83-97, (1955). [Retrieved from the Internet May 8, 2017: <https://tom.host.cs.st-andrews.ac.uk/CS3052-CC/Practicals/Kuhn.pdf>].
Lakshminarayanan, et al., "Rfdump; An Architecture for Monitoring the Wireless Ether," ACM CoNEXT, (2009).
Lamprecht, et al., "Passive Alignment of Optical Elements in a Printed Circuit Board," Electric Components and Technology Conference, (2006).
Lee, et al., "Improving Wireless Simulation Through Noise Modeling," Proceedings of the 6th international conference on Information processing in sensor networks (IPSN), pp. 21-30, (2007).
Leith, et al., "TCP Fairness in 802.11e WLANs," IEEE Communications Letters, 9(12), (2005).
Levis, et al., "T2: A Second Generation OS for Embedded Sensor Networks," Technical Report TKN-05-007, Telecommunication Networks Group, Technische Universitat Berlin, (2005).
Liang, et al., "Sensing-Throuhput Tradeoff for Cognitive Radio Networks," IEEE Transactions on Wireless Communications, 7(4):1326-1337, (2008).
Liang et al., "Surviving Wi-Fi Interference in Low Power Zigbee Networks," Proceedings of the Eighth ACM Conference on Embedded Networked Sensory Systems (SenSys), (2010).
Lin, et al., "Data Discovery and Dissemination with DIP," Proceedings of the 7th international conference on Information processing in sensor networks (IPSN), pp. 433-444, (2008).
Matheus, "Optimal Design of a Multicarrier Systems with Soft Impulse Shaping Including Equalization in Time or Frequency Direction," Global Telecommunications Conference, 1997, GLOBECOM '97, IEEE, vol. 1, pp. 310-314, (Nov. 1997).
Mattingly, et al., "CVXGEN: a code generator for embedded convex optimization," Optimization and Engineering, 13(1):1-27, (2012). [Retrieved from the Internet May 9, 2017: <http://stanford.edu/~boyd/papers/pdf/code_gen_impl.pdf].
Maxim Integrated, Power Amplifier Data-sheet. [Retrieved from the Internet Dec. 6, 2016: <http://datasheets.maximintegrated.com/en/ds/MAX2828-MAX2829.pdf>].
Mini-Circuits, Power Amplifier Data-sheet. [Retrieved from the Internet Dec. 6, 2016: <http://www.minicircuits.com/pdfs/PGA-105+.pdf>].
Mini-Circuits, Power Amplifier Data-sheet. [Retrieved from the Internet Dec. 6, 2016: <http://www.minicircuits.com/pdfs/ZHL-30W-262+.pdf>].
Morgan, et al, "A Generalized Memory Polynomial Model for Digital Predistortion of RF Power Amplifiers," IEEE Transactions on Signal Processing, 54(10):3852-3860, (2006).
National Instruments, N1 5781 Datasheet, (2011). [Retrieved from the Internet Dec. 6, 2016: <http://sine.ni.com/ds/app/doc/p/id/ds-212/lang/en>].
National Instruments, NI PXIe-8133 User Manual, (Jul. 2012). [Retrieved from the Internet Dec. 13, 2016: <www.ni.com/pdf/manuals/372870d.pdf>].
National Instruments, White Paper: "Understanding Dynamic Hardware Specifications," (Mar. 2010).
Palazzi, et al., "A RIO-Like Technique for Interactivity Loss-Avoidance in Fast-Paced Multiplayer Online Games," ACM Computers in Entertainment, (2005).
Peregrine Semiconductor, PE 47303 Data-sheet. [Retrieved from the Internet Dec. 6, 2016: <http://www.psemi.com/pdf/datasheets/pe43703ds.pdf>].
Polastre, et al., "A Unifying Link Abstraction for Wireless Sensor Networks," SenSys '05: Proceedings of the 3rd international conference on Embedded networked sensor systems, pp. 76-89, (2005).
Poston, et al., "Discontiguous OFDM Considerations for Dynamic Spectrum Access in Idle TV Channels," IEEE DySPAN, (2005).
Pu, et al., "Whole-Home Gesture Recognition Using Wireless Signals," Proceedings of the 19th Annual International Conference on Mobile Computing & Networking, MobiCom '13, pp. 27-38, (2013). [Retrieved from the Internet May 9, 2017: https://wisee.cs.washington.edu/wisee_paper.pdf].
Radunović, et al., "Efficiency and Fairness in Distributed Wireless Networks Through Self-Interference Cancellation and Scheduling," Technical Report MSR-TR-2009-27, Microsoft Research, (2009).
Radunović, et al., "Rethinking Indoor Wireless Mesh Design: Low Power, Low Frequency, Full-duplex," Fifth IEEE Workshop on Wireless Mesh Networks (WiMesh), pp. 1-6, (2010).
Rahul, et al., "Learning to Share: Narrowband-Friendly Wideband Networks," ACM SIGCOMM, (2008).
Ralston, et al., Real-time Through-wall Imaging Using an Ultrawideband Multiple-Input Multiple-Output (MIMO) Phased Array Radar System, 2010 IEEE Symposium on Phased Array Systems and Technology (ARRAY), pp. 551-558, (2010).
Remcom, "Modeling Indoor Propagation." [Retrieved from the Internet May 8, 2017: http://www.remcom.com/examples/modeling-indoor-propagation.html].
Rice University, WARP Project. [Retrieved from the Internet Dec. 8, 2016: <http://warp.rice.edu>].
Rohde & Schwarz, "Rohde & Schwarz FSW Signal and Spectrum Analyzer User Manual," (2016). [Retrieved from the Internet Dec. 10, 2016: <https://cdn.rohde-schwarz.com/pws/dl_downloads/dl_common_library/dl_manuals/gb_1/f/fsw_1/FSW_UserManual_en_26.pdf>].
Rohde & Schwarz, "Rohde & Schwarz SMBV 100A Signal Generator User Manual," (2016). [Retrieved from the Internet Dec. 6, 2016: <https://cdn.rohde-schwarz.com/pws/dl_downloads/dl_common_library/dl_manuals/gb_1/s/smbv/SMBV100A_OperatingManual_en_16.pdf>].
Sahai et al., "On the Impact of Phase Noise on Active Cancellation in Wireless Full-Duplex," (2012). [Retrieved from the Internet Oct. 25, 2016: https://arxiv.org/pdf/1212.5462].
Sahai, et al., "Spectrum Sensing: Fundamental limits," draft chapter for a Springer Book: Cognitive Radios: System Design Perspective, (Jun. 2009).
Sen, et al., "AccuRate: Constellation Based Rate Estimation in Wireless Networks," Proceedings of the Seventh USENIX Symposium on Networked Systems Design and Implementation (NSDI), (2010).
Sen, et al., "CSMA/CN: Carrier Sense Multiple Access with Collision Notification," Proceedings of the 16th annual international conference on Mobile computing and networking (MobiCom), pp. 25-36, (2010).
Shen, et al., "Channel Estimation in OFDM Systems," Application Note, Freescale Semiconductor, (2006).

(56) References Cited

OTHER PUBLICATIONS

Srinivasan, et al., "An Empirical Study of Low-Power Wireless," ACM Transactions on Sensor Networks, 6(2):1-49, (2010).
Srinivasan, et al., "RSSI is Under Appreciated," Proceedings of the Third Workshop on Embedded Networked Sensors (EmNets), (2006).
Srinivasan, et al., "Some Implications of Low Power Wireless to IP Networking," Proceedings of the Fifth Workshop on Hot Topics in Networks (HotNets-V), (Nov. 2006).
Srinivasan, et al., "The κ-Factor: Inferring Protocol Performance Using Inter-Link Reception Correlation," Proceedings of the 16th annual international conference on Mobile computing and networking (MobiCom), (2010).
Srinivasan, et al., The β-factor: Measuring Wireless Link Burstiness, Proceedings of the Sixth ACM Conference on Embedded Networked Sensor Systems, (Nov. 2008).
Sundstrom et al., "Power Dissipation Bounds for High-Speed Nyquist Analog-to-Digital Converters," IEEE Transactions on Circuits and Systems I: Regular Papers, 56(3):509-518, (2009).
Surowiec et al., "Dielectric Properties of Breast Carcinoma and the Surrounding Tissues," IEEE Transactions on Biomedical Engineering, 35(4):257-263, (1988).
Tan, et al., "Fine Grained Channel Access in Wireless LAN," ACM SIGCOMM, (2010).
Tan, et al., "Spectrum Virtualization Layer," MSR Tech Report, (2011). [Retrieved from the Internet Dec. 8, 2016: <http://research.microsoft.com/apps/pubs/default.aspx?id=154410>].
Tavakoli, et al., "A Declarative Sensornet Architecture," Proceedings of the International Workshop on Wireless Sensornet Architecture (WWSNA), (2007).
Tibshirani, "Regression shrinkage and selection via the lasso," Journal of the Royal Statistical Society, Series B (Methodological), pp. 267-288 (1996).
Tomlinson, "New Automatic Equaliser Employing Modulo Arithmetic," Electronic Letters, 7(5/6):138-139, (1971).
Tourrilhes, "Fragment Adaptive Reduction: Coping with Various interferers in radio unlicensed bands," IEEE IC, (2001).
Tse et al., "Fundamentals of Wireless Communications," Aug. 13, 2004. [Retrieved from the Internet Oct. 25, 2016: www.eecs.berkeley.edu/~dtse/main.pdf].
Van De Beek, et al., "On Channel Estimation in OFDM Systems," IEEE 45th Vehicular Technology Conference, vol. 2, pp. 815-819, (1995).
Vutukuru, et al., "Cross-Layer Wireless Bit Rate Adaption," SIGCOMM Comput. Commun. Rev., 39(4):3-14, (2009).
Weingarten, et al., "The Capacity Region of the Gaussian Multiple-Input Multiple-Output Broadcast Channel," IEEE Transactions on Information Theory, 52(9):3936-3964, (2006).
Welch, et al., "An Introduction to the Kalman Filter," Technical report, Chapel Hill, NC, USA, (2006). [Retrieved from the Internet May 9, 2017: <https://www.cs.unc.edu/~welch/media/pdf/kalman_intro.pdf>].
Wi-Fi Alliance, WiFi Direct Industry White Paper, (2010), [Retrieved from the Internet Dec. 13, 2016: <http://www.wi-fi.org/discover-wi-fi/wi-fi-direct>].
Wikipedia, "Star Trek Tricoder," [Retrieved from the Internet Oct. 26, 2016: http://en.wikipedia.org/wiki/Tricorder].
Winter, et al., "RPL: IPv6 Routing Protocol for Low power and Lossy Networks," IETF Internet draft (Work in Progress), (Jul. 2010). [Retrieved from the Internet Dec. 8, 2016: <https://tools.ietf.org/id/draft-ietf-roll-rpl-11.txt>].
Wischik, et al., "Design, implementation and evaluation of congestion control for multipath TCP," USENIX NSDI, (2011).
Xilinx, DS249: LogiCore IP CORDIC v4.0 Data Sheet, (Mar. 1, 2011). [Retrieved from the Internet Dec. 3, 2016: <http://www.xilinx.com/support/documentation/ip_documentation/cordic_ds249.pdf>].
Xilinx, UG193: XtremeDSP User Guide, (Jan. 26, 2012). [Retrieved from the Internet Dec. 6, 2016: <https://www.xilinx.com/support/documentation/user_guides/ug193.pdf>].

Xiong et al., "ArrayTrack: A Fine-Grained Indoor Location System" In Proceedings of the 10th USENIX conference on Networked Systems Design and Implementation, nsdi'13, pp. 71-84, USENIX Association, Berkeley, CA, USA, (2013).
Yang, et al., "Supporting Demanding Wireless Applications with Frequency-agile Radios," USENIX NSDI, (2010).
Yang, et al., "The Spaces Between Us: Sensing and Maintaining Boundaries in Wireless Spectrum Access," ACM MOBICOM, (2010).
Yoo, et al., "On the Optimality of Multiantenna Broadcast Scheduling Using Zero-Forcing Beamforming," IEEE Journal on Selected Areas in Communications, 24(3):528-541, (2006).
Yuan, et al., "KNOWS: Kognitiv Networking Over White Spaces," IEEE DySPAN, (2007).
Zhang et al., "A novel method for microwave breast cancer detection," Progress in Electromagnetics Research, vol. 83: 413-434, (2008).
Zhang, et al., "Gain/Phase Imbalance-Minimization Techniques for LINC Transmitters," IEEE Transactions on Microwave Theory and Techniques, 49(12):2507-2516, (2001).
Chinese Application No. 201380041721.0, First Office Action dated Nov. 18, 2015.
EPO Application No. 20130801200, Supplementary European Search Report dated Feb. 4, 2016.
PCT International Preliminary Report on Patentability for application PCT/US2015/029105 dated Nov. 8, 2016.
PCT International Preliminary Report on Patentablility for application PCT/US2012/023183 dated Aug. 6, 2013.
PCT International Preliminary Report on Patentablility for application PCT/US2012/023184 dated Aug. 6, 2013.
PCT International Preliminary Report on Patentablility for application PCT/US2013/044830 dated Dec. 9, 2014.
PCT International Preliminary Report on Patentablility for application PCT/US2013/075166 dated Jun. 16, 2015.
PCT International Preliminary Report on Patentablility for application PCT/US2014/014726 dated Aug. 4, 2015.
PCT International Preliminary Report on Patentablility for application PCT/US2014/050584 dated Feb. 9, 2016.
PCT International Preliminary Report on Patentablility for application PCT/US2014/058117 dated Mar. 29, 2016.
PCT International Preliminary Report on Patentablility for application PCT/US2014/065814 dated May 17, 2016.
PCT International Search Report and Written Opinion of the International Searching Authority for application PCT/US2012/023183 dated May 17, 2012.
PCT International Search Report and Written Opinion of the International Searching Authority for application PCT/US2012/023184 dated May 7, 2012.
PCT International Search Report and Written Opinion of the International Searching Authority for application PCT/US2013/075166 dated Apr. 22, 2014.
PCT International Search Report and Written Opinion of the International Searching Authority for application PCT/US2014/014726 dated Jun. 2, 2014.
PCT International Search Report and Written Opinion of the International Searching Authority for application PCT/US2014/050584 dated Jan. 21, 2015.
PCT International Search Report and Written Opinion of the International Searching Authority for application PCT/US2014/058117 dated Dec. 30, 2014.
PCT International Search Report and Written Opinion of the International Searching Authority for application PCT/US2014/065814 dated Feb. 19, 2015.
PCT International Search Report and Written Opinion of the International Searching Authority for application PCT/US2015/029105 dated Jul. 27, 2015.
PCT International Search Report for application PCT/US2013/044830 dated Sep. 26, 2013.
PCT Written Opinion of the International Searching Authority for application PCT/US2013/044830 dated Sep. 26, 2013.
U.S. Appl. No. 13/293,069, Advisory Action dated Aug. 29, 2017.
U.S. Appl. No. 13/293,069, Final Office Action dated May 2, 2017.
U.S. Appl. No. 13/293,069, Final Office Action dated Jun. 8, 2016.

(56) References Cited

OTHER PUBLICATIONS

U.S. Appl. No. 13/293,069, Final Office Action dated Oct. 21, 2014.
U.S. Appl. No. 13/293,069, Non-Final Office Action dated Jan. 6, 2017.
U.S. Appl. No. 13/293,069, Non-Final Office Action dated May 1, 2014.
U.S. Appl. No. 13/293,069, Non-Final Office Action dated Jul. 17, 2013.
U.S. Appl. No. 13/293,069, Non-Final Office Action dated Sep. 21, 2015.
U.S. Appl. No. 13/293,069, Notice of Allowance dated Sep. 27, 2017.
U.S. Appl. No. 13/293,069, Notice of Allowance dated Oct. 6, 2017.
U.S. Appl. No. 13/293,072, Final Office Action dated Mar. 15, 2016.
U.S. Appl. No. 13/293,072, Final Office Action dated Aug. 3, 2017.
U.S. Appl. No. 13/293,072, Final Office Action dated Mar. 31, 2014.
U.S. Appl. No. 13/293,072, Non-Final Office Action dated Jan. 13, 2017.
U.S. Appl. No. 13/293,072, Non-Final Office Action dated Jul. 17, 2015.
U.S. Appl. No. 13/293,072, Non-Final Office Action dated Jul. 19, 2013.
U.S. Appl. No. 13/762,043, Final Office Action dated Jun. 8, 2015.
U.S. Appl. No. 13/762,043, Non-Final Office Action dated Nov. 17, 2014.
U.S. Appl. No. 13/762,043, Notice of Allowance dated Nov. 9, 2015.
U.S. Appl. No. 13/913,323, Final Office Action dated Apr. 21, 2015.
U.S. Appl. No. 13/913,323, Non-Final Office Action dated Mar. 12, 2015.
U.S. Appl. No. 13/913,323, Notice of Allowance dated Feb. 12, 2016.
U.S. Appl. No. 13/913,323, Notice of Allowance dated Oct. 16, 2015.
U.S. Appl. No. 13/913,323, Notice of Allowance dated Nov. 5, 2015.
U.S. Appl. No. 13/913,323, Notice of Allowance dated Nov. 13, 2015.
U.S. Appl. No. 14/456,807, Non-Final Office Action dated Mar. 4, 2016.
U.S. Appl. No. 14/456,807, Non-Final Office Action dated Oct. 25, 2017.
U.S. Appl. No. 15/025,256, Non-Final Office Action dated Oct. 19, 2017.
U.S. Appl. No. 15/133,175, Non-Final Office Action dated Sep. 21, 2017.
CA Application No. 3,041,667, Examination Report dated May 5, 2020.
EP Application No. 17863512.4 (now published as EP3532981), Supplementary European Search Report and European Search Opinion dated May 27, 2020.
U.S. Appl. No. 13/293,072, Notice of Allowance dated Dec. 27, 2018.
U.S. Appl. No. 15/025,256, Notice of Allowance dated Jan. 3, 2019.
U.S. Appl. No. 15/676,474, Notice of Allowance dated Jan. 17, 2019.
U.S. Appl. No. 15/033,889, Notice of Allowance dated Nov. 13, 2019.
Abari, et al., "Caraoke: An E-Toll Transponder Network for Smart Cities," Proceedings of the 2015 ACM Conference on Special Interest Group on Data Communication, SIGCOMM '15, pp. 297-310, ACM, (2015). [Retrieved from the Internet Nov. 27, 2017: <http://www.mit.edu/~abari/Papers/Sigcomm15.pdf>].
Argenox, "A BLE Advertising Primer," 14 pages. [Retrieved from the Internet Nov. 13, 2017: <http://www.argenox.com/bluetooth-low-energy-ble-v4-0-development/library/a-ble-advertising-primer/>].
Bharadia, et al., "BackFi: High Throughput WiFi Backscatter," Proceedings of the 2015 ACM Conference on Special Interest Group on Data Communication, pp. 283-296, ACM, (2015). [Retrieved from the Internet Nov. 27, 2017: <https://web.stanford.edu/~skatti/pubs/sigcomm15-backfi.pdf>].
Bharadia, et al., "FastForward: Fast and Constructive Full Duplex Relays," Proceedings of the 2014 ACM Conference on SIGCOMM, pp. 199-210, ACM, (2014). [Retrieved via the Internet Nov. 28, 2017: <https://web.stanford.edu/~skatti/pubs/sigcomm14-ff.pdf>].
Bharadia, et al., "Full Duplex Mimo Radios," Proceedings of the 11th USENIX Symposium on Networked Systems Design and Implementation (NSDI 14), pp. 359-372, USENIX Association, (2014). [Retrieved from the Internet Nov. 27, 2017: <https://www.usenix.org/system/files/conference/nsdi14/nsdi14-paper-bharadia.pdf>].
Buettner, et al., "An Empirical Study of UHF RFID Performance," Proceedings of the 14th ACM International Conference on Mobile Computing and Networking, ACM, 223-234, (2008). [Retrieved from the Internet Nov. 27, 2017: <http://citeseerx.ist.psu.edu/viewdoc/download?doi=10.1.1.163.4811&rep=rep1&type=pdf>].
Choi, et al., "Achieving Single Channel, Full Duplex Wireless Communication," Proceedings of the 16th Annual International Conference on Mobile Computing and Networking, pp. 1-12, ACM, (2010). [Retrieved via the Internet Nov. 27, 2017: <https://sing.stanford.edu/pubs/mobicom10-duplex.pdf>].
Ensworth, et al., "Every Smart Phone is a Backscatter Reader: Modulated Backscatter Compatibility with Bluetooth 4.0 Low Energy (BLE) Devices," 2015 IEEE International Conference on RFID, pp. 78-85, IEEE, (2015).
Ettus Research, "VERT2450 Antenna," 1 page. https://www.ettus.com/product/details/VERT2450. [Retrieved via the Internet Nov. 27, 2017: https://www.ettus.com/product/details/VERT2450].
Gollakota, et al., "The Emergence of RF-Powered Computing," Computer, 47(1):32-39, (2014). [Retrieved via the Internet Nov. 27, 2017: <http://citeseerx.ist.psu.edu/viewdoc/download?doi=10.1.1.472.5564&rep=rep1&type=pdf>].
Gummeson, et al., "Flit: A Bulk Transmission Protocol for RFID-Scale Sensors," Proceedings of the 10th International Conference on Mobile Systems, Applications, and Services, pp. 71-84, ACM, (2012). [Retrieved via the Internet Nov. 27, 2017: <https://web.stanford.edu/~pyzhang/papers/sys010fp-gummeson.pdf>].
Halperin, et al., "Tool Release: Gathering 802.11n Traces with Channel State Information," ACM SIGCOMM Computer Communication Review, 41(1):53, 2011. [Retrieved via the Internet Nov. 27, 2017: <http://www.sigcomm.org/sites/default/files/ccr/papers/2011/January/1925861-1925870.pdf>].
Hassanieh, et al., "Securing RFIDs by Randomizing the Modulation and Channel," Proceedings of the 12th USENIX Symposium on Networked Systems Design and Implementation (NSDI '15), (2015). [Retrieved via the Internet Nov. 27, 2017: <https://www.usenix.org/system/files/conference/nsdi15/nsdi15-paper-hassanieh.pdf>].
Hu, et al., "Braidio: An Integrated Active-Passive Radio for Mobile Devices with Asymmetric Energy Budgets," Proceedings of the 2016 Conference on ACM SIGCOMM 2016 Conference, pp. 384-397, ACM, (2016). [Retrieved via the Internet Nov. 27, 2017: <https://people.cs.umass.edu/~dganesan/papers/Sigcomm16-Braidio.pdf>].
Hu, et al., "Laissez-Faire: Fully Asymmetric Backscatter Communication," Proceedings of the 2015 ACM Conference on Special Interest Group on Data Communication, pp. 255-267, ACM, (2015). [Retrieved via the Internet Nov. 27, 2017: <https://conferences.sigcomm.org/sigcomm/2015/pdf/papers/p255.pdf>].
Hu, et al., "Leveraging Interleaved Signal Edges for Concurrent Backscatter," Proceedings of the 1st ACM Workshop on Hot Topics in Wireless, pp. 13-18, ACM, (2014). [Retrieved via the Internet Nov. 27, 2017: <https://panhu.me/pdf/BST.pdf>].
Iyer, et al., "Inter-Technology Backscatter: Towards Internet Connectivity for Implanted Devices," Proceedings of the 2016 Conference on ACM SIGCOMM 2016 Conference, pp. 356-369, ACM (2016). [Retrieved via the Internet Nov. 27, 2017: <https://homes.cs.washington.edu/~gshyam/Papers/interscatter.pdf>].
Jain, et al., "Practical, Real-Time, Full Duplex Wireless," Proceedings of the 17th Annual International Conference on Mobile Com-

(56) References Cited

OTHER PUBLICATIONS puting and Networking, pp. 301-312, ACM, (2011). [Retrieved via the Internet Nov. 27, 2017: <https://web.stanford.edu/~skatti/pubs/mobicom11-duplex.pdf>].

Jain, et al., "Throughput Fairness Index: An Explanation," Technical Report, Department of CIS, The Ohio State University, 9 pages, (1999). [Retrieved via the Internet Nov. 27, 2017: <http://www.cse.wustl.edu/~jain/atmf/ftp/atm99-0045.pdf>].

Katti, et al., "Embracing Wireless Interference: Analog Network Coding," ACM SIGCOMM Computer Communication Review, 37(4):397-408, ACM, (2007). [Retrieved via the Internet Nov. 27, 2017: <https://homes.cs.washington.edu/~gshyam/Papers/anc.pdf>].

Katti, et al., "XORS in the Air: Practical Wireless Network Coding," IEEE/ACM Transactions on Networking (ToN), 16(3):497-510, (2008). [Retrieved via the Internet Nov. 27, 2017: <http://citeseerx.ist.psu.edu/viewdoc/download?doi=10.1.1.212.6393&rep=rep1&type=pdf>].

Kellogg, et al., "Bringing Gesture Recognition to All Devices," Proceedings of the 11th USENIX Symposium on Networked Systems Design and Implementation (NSDI '14), pp. 303-316, (2014). [Retrieved via the Internet Nov. 27, 2017: <https://www.usenix.org/system/files/conference/nsdi14/nsdi14-paper-kellogg.pdf>].

Kellogg, et al., "Passive Wi-Fi: Bringing Low Power to Wi-Fi Transmissions," Proceedings of the 13th USENIX Symposium on Networked Systems Design and Implementation (NSDI '16), pp. 151-164, (2016). [Retrieved via the Internet Nov. 27, 2017: <https://www.usenix.org/system/files/conference/nsdi16/nsdi16-paper-kellogg.pdf>].

Kellogg, et al., "Wi-Fi Backscatter: Internet Connectivity for RF-Powered Devices," Proceedings of the 2014 ACM Conference on SIGCOMM, pp. 607-618, ACM, (2014). [Retrieved via the Internet Nov. 27, 2017: <https://homes.cs.washington.edu/~gshyam/Papers/wifibackscatter.pdf>].

Liu, et al., "Ambient Backscatter: Wireless Communications Out of Thin Air," ACM SIGCOMM Computer Communication Review, 43:39-50, (2013). [Retrieved via the Internet Nov. 27, 2017: <http://abc.cs.washington.edu/files/comm153-liu.pdf>].

Liu, et al., "Enabling Instantaneous Feedback with Full-duplex Backscatter," Proceedings of the 20th Annual International Conference on Mobile Computing and Networking, pp. 67-78, ACM, (2014). [Retrieved via the Internet Nov. 27, 2017: <https://homes.cs.washington.edu/~gshyam/Papers/fullduplexbackscatter.pdf>].

Mango Communications, 802.11 Reference Design: PHY, 4 pages. [Retrieved via the Internet Nov. 27, 2017: <https://warpproject.org/trac/wiki/802.11/PHY>].

Ou, et al., "Come and Be Served: Parallel Decoding for COTS RFID Tags," Proceedings of the 21st Annual International Conference on Mobile Computing and Networking, ACM, pp. 500-511, (2015). [Retrieved via the Internet Nov. 27, 2017: <https://www.sigmobile.org/mobicom/2015/papers/p500-ouA.pdf>].

Parks, et al., "Turbocharging Ambient Backscatter Communication," Proceedings of the 2014 ACM Conference on SIGCOMM, pp. 619-630, ACM, (2014). [Retrieved via the Internet Nov. 27, 2017: <https://homes.cs.washington.edu/~gshyam/Papers/turbocharge.pdf>].

Patel, et al., "A review of wearable sensors and systems with application in rehabilitation," Journal of Neuroengineering and Rehabilitation, 9(1):21 (17 pages), (2012). [Retrieved via the Internet Nov. 27, 2017: <https://jneuroengrehab.biomedcentral.com/track/pdf/10.1186/1743-0003-9-21?site=jneuroengrehab.biomedcentral.com>].

Pletcher, "Ultra-Low Power Wake-Up Receivers for Wireless Sensor Networks," Ph.D. Dissertation, University of California Berkeley, 164 pages, (2008). [Retrieved via the Internet Nov. 27, 2017: <https://www2.eecs.berkeley.edu/Pubs/TechRpts/2008/EECS-2008-59.pdf>].

Talla, et al., "Hybrid Analog-Digital Backscatter: A New Approach for Battery-Free Sensing," 2013 IEEE International Conference on RFID, pp. 74-81, (2013).

Talla, et al., "Powering the Next Billion Devices with Wi-Fi," arXiv preprint arXiv:1505.06815, (2015). [Retrieved via the Internet Nov. 27, 2017: <https://arxiv.org/pdf/1505.06815.pdf>].

Ti,Ti CC2541 radio, 3 pages. [Retrieved via the Internet Nov. 27, 2017: <http://www.ti.com/product/CC2541>].

Ti, Ti CC2650 radio, 3 pages. [Retrieved via the Internet Nov. 27, 2017: <http://www.ti.com/product/CC2650>].

Wang, et al., "Dude, Where's My Card?: RFID Positioning That Works with Multipath and Non-Line of Sight," ACM SIGCOMM Computer Communication Review, 43:51-62, ACM, (2013). [Retrieved via the Internet Nov. 27, 2017: <http://citeseerx.ist.psu.edu/viewdoc/download?doi=10.1.1.594.4575&rep=rep1&type=pdf>].

Wang, et al., "Efficient and Reliable Low-Power Backscatter Networks," Proceedings of the ACM SIGCOMM 2012 Conference on Applications, Technologies, Architectures, and Protocols for Computer Communication, pp. 61-72, ACM, (2012). [Retrieved via the Internet Nov. 27, 2017: <http://haitham.ece.illinois.edu/Papers/sigcomm12-backscatter.pdf>].

Wang, et al., "Rf-Compass: Robot Object Manipulation Using RFIDs," Proceedings of the 19th Annual International Conference on Mobile Computing & Networking (MobiCom '13), pp. 3-14, ACM, (2013). [Retrieved via the Internet Nov. 27, 2017: <https://dspace.mit.edu/openaccess-disseminate/1721.1/87045>].

Wang, et al., "RF-IDraw: Virtual Touch Screen in the Air Using RF Signals," Proceedings of the 2014 ACM conference on SIGCOMM, pp. 235-246, (2014). [Retrieved via the Internet Nov. 27, 2017: <http://www.sigcomm.org/sites/default/files/ccr/papers/2014/August/2619239-2626330.pdf>].

Yang, et al., "Tagoram: Real-Time Tracking of Mobile RFID Tags to High Precision Using COTS Devices," Proceedings of the 20th Annual International Conference on Mobile Computing and Networking, ACM, 237-248, (2014). [Retrieved via the Internet Nov. 27, 2017: <http://citeseerx.ist.psu.edu/viewdoc/download?doi=10.1.1.431.5456&rep=rep1&type=pdf>].

Zhang, "FreeRider hardware and software source code," 2 pages, 2017. [Retrieved via the Internet Nov. 27, 2017: >https://github.com/pengyuzhang/FreeRider>].

Zhang, et al., "Enabling Backscatter Communication among commodity Wi-Fi Radios," Proceedings of the 2016 ACM SIGCOMM Conference pp. 611-612; Aug. 22, 2016.

Zhang, et al., "BLINK: A High Throughput Link Layer for Backscatter Communication," Proceedings of the 10th International Conference on Mobile Systems, Applications, and Services, pp. 99-112, ACM, (2012). [Retrieved via the Internet Nov. 27, 2017: <http://lass.cs.umass.edu/~gummeson/MobiSys12-BLINK.pdf>].

Zhang, et al., "EkhoNet: High Speed Ultra Low-power Backscatter for Next Generation Sensors," Proceedings of the 20th Annual International Conference on Mobile Computing and Networking, pp. 557-568, ACM, (2014). [Retrieved from the Internet Nov. 28, 2017: <https://people.cs.umass.edu/~dganesan/papers/Mobicom14-EkhoNet.pdf>].

Zhang, et al., "Enabling Bit-by-Bit Backscatter Communication in Severe Energy Harvesting Environments," Proceedings of the 11th USENIX Symposium on Networked Systems Design and Implementation (NSDI '14), Berkeley, CA, (2014). [Retrieved via the Internet Nov. 27, 2017: <https://www.usenix.org/system/files/conference/nsdi14/nsdi14-paper-zhang.pdf>].

Zhang, et al., "Enabling Practical Backscatter Communication for On-body Sensors," Proceedings of the 2016 conference on ACM SIGCOMM 2016 Conference, pp. 370-383, ACM, (2016). [Retrieved via the Internet Nov. 27, 2017: <https://pdfs.semanticscholar.org/be77/7196c9fdf60c667d3e020b77b28223b5cd3b.pdf>].

Zhang, et al., "HitchHike: Practical Backscatter Using Commodity WiFi," SenSys '16, ACM, 13 pages, (2016). [Retrieved via the Internet Nov. 27, 2017: <https://web.stanford.edu/~pyzhang/papers/sensys16_back_comm.pdf>].

Zhang, et al., "QuarkOS: Pushing the operating limits of micropowered sensors," Proceedings of the 14th USENIX conference on Hot Topics in Operating Systems, p. 7, USENIX Association, (2013). [Retrieved via the Internet Nov. 27, 2017: <https://www.usenix.org/system/files/conference/hotos13/hotos13-final19.pdf>].

(56) References Cited

OTHER PUBLICATIONS

PCT International Search Report and Written Opinion of the International Searching Authority for application PCT/US2017/058371 dated Jan. 12, 2018.
U.S. Appl. No. 13/293,072, Applicant Initiated Interview Summary dated Aug. 7, 2018.
U.S. Appl. No. 13/293,072, Final Office Action dated Apr. 5, 2018.
U.S. Appl. No. 13/293,072, Notice of Allowance dated Oct. 17, 2018.
U.S. Appl. No. 14/456,807, Non-Final Office Action dated Sep. 21, 2018.
U.S. Appl. No. 14/456,807, Notice of Allowance dated Jun. 6, 2018.
U.S. Appl. No. 15/025,256, Notice of Allowance dated May 21, 2018.
U.S. Appl. No. 15/025,256, Notice of Allowance dated Sep. 13, 2018.
U.S. Appl. No. 15/033,889, Non-Final Office Action dated Apr. 27, 2018.
U.S. Appl. No. 15/133,175, Final Office Action dated May 10, 2018.
U.S. Appl. No. 15/676,474, Non-Final Office Action dated May 25, 2018.
U.S. Appl. No. 14/456,807, Notice of Allowance dated Mar. 1, 2019.
WIPO Application No. PCT/US2017/058371, PCT International Preliminary Report on Patentability dated Apr. 30, 2019.
U.S. Appl. No. 15/133,175, Notice of Allowance dated Nov. 28, 2018.
U.S. Appl. No. 15/033,889, Final Office Action dated Nov. 26, 2018.
U.S. Appl. No. 15/7633,889, Notice of Allowance dated Jan. 27, 2021.

* cited by examiner

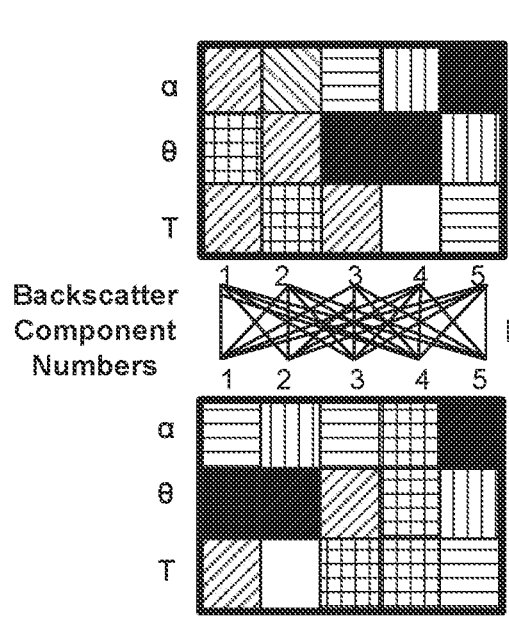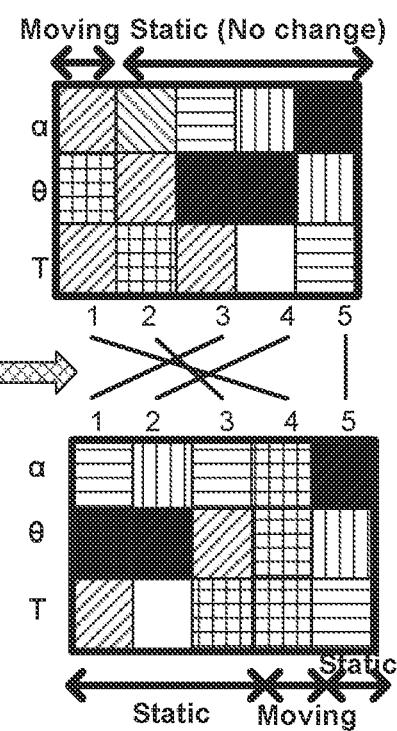
FIG. 9A
FIG. 9B

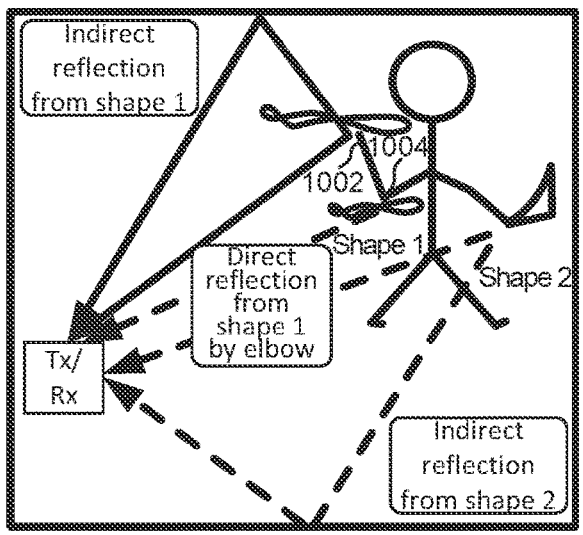 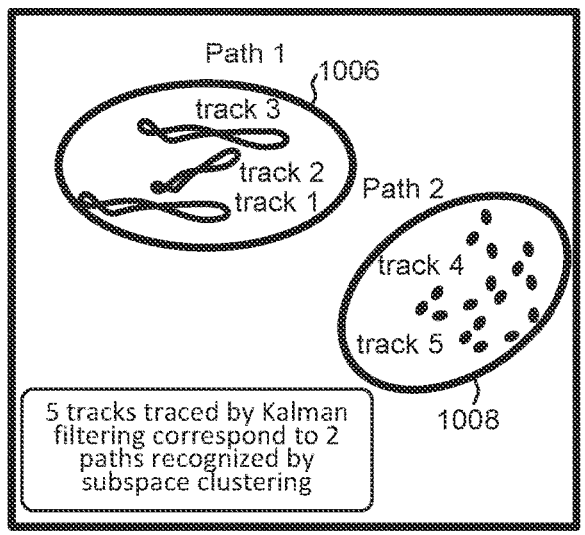
FIG. 10A                                   FIG. 10B

METHOD AND APPARATUS FOR TRACKING MOTION USING RADIO FREQUENCY SIGNALS

CROSS-REFERENCES TO RELATED APPLICATION

This Application is a 371 National Stage Application of PCT/US2015/029105, filed on May 4, 2015 and entitled "METHOD AND APPARATUS FOR TRACKING MOTION USING RADIO FREQUENCY SIGNALS," which claims priority to U.S. Provisional Application No. 61/987,790, filed May 2, 2014, entitled "METHOD AND APPARATUS FOR TRACING MOTION USING RADIO FREQUENCY SIGNALS." The present invention is related to U.S. Provisional Application No. 61/864,492, filed Aug. 9, 2013, entitled "FULL DUPLEX RADIOS," and U.S. Provisional Application No. 61/904,428, filed Nov. 14, 2013, entitled "BACKSCATTER ESTIMATION USING PROGRESSIVE SELF INTERFERENCE CANCELLATION," the contents of which are incorporated herein by reference in their entirety.

STATEMENT AS TO RIGHTS TO INVENTIONS MADE UNDER FEDERALLY SPONSORED RESEARCH AND DEVELOPMENT

This invention was made with Government support under contract 0832820 awarded by the National Science Foundation. The Government has certain rights in this invention.

FIELD OF THE INVENTION

The present invention relates to measuring systems and methods for detecting motion, and more particularly to a system and method for detecting and/or tracing motion using radio signals.

BACKGROUND OF THE INVENTION

Many devices are available in the market for detecting movement of objects in an environment. For example, motion sensors may be used in indoor and/or outdoor environments to turn lights on and/or off. In addition, motion sensors can be used in security applications. Recently, cameras are used to detect hand gestures in front of a computer/smartphone. However, these cameras are unable to detect motion in low-light or dark environments. In general, motion detection can have many applications, such as healthcare, security, home efficiency and the like. Detecting motion efficiently in a variety of environments remains a challenge.

BRIEF DESCRIPTION OF THE DRAWINGS

FIGS. 9A and 9B illustrate an example application of Hungarian algorithm for a subset of backscatter components, according to one embodiment of the present invention.

FIGS. 10A and 10B illustrate an example movement of a human hand, according to one embodiment of the present invention.

SUMMARY

Figure 1:
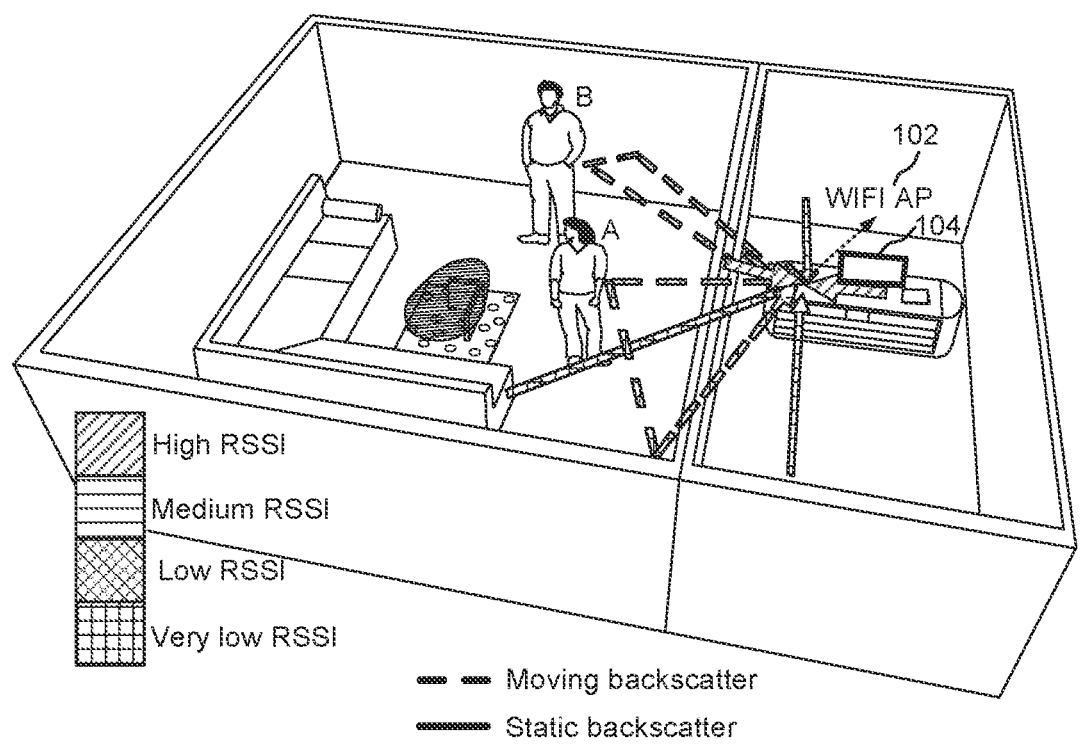
FIG. 1 illustrates an example home scenario, in which Wi-Fi signals are scattered by objects, according to one embodiment of the present invention.

In one embodiment, a method for detecting motion in an environment is disclosed. The method includes, in part, transmitting a radio frequency signal, receiving a composite signal comprising a plurality of backscatter signals. The plurality of the backscatter signals correspond to a reflection of the radio frequency signal from one or more objects in the environment. The one or more objects include at least one moving object and one or more static objects. The method further includes, in part, detecting the at least one moving object in accordance with the composite signal. The method includes, in part, estimating one or more parameters corresponding to a plurality of backscatter signals corresponding to the at least one moving object. The one or more parameters are estimated by progressively removing one or more backscatter signals corresponding to the one or more static objects from the composite signal.

In one embodiment, a method for tracing motion is disclosed. The method includes, in part, receiving information corresponding to one or more moving objects from one or more devices. The information includes one or more parameters corresponding to one or more backscatter signals being reflected from the one or more moving objects. The method further includes, in part, estimating location of at least one of the one or more moving objects in accordance with the received information from the one or more devices.

The method further includes identifying a plurality of paths corresponding to the at least one moving object in accordance with the received information, determining one or more motion categories by finding one or more associations between the identified plurality of paths and the at least one moving object, and determining a number of moving objects corresponding to the number of motion categories.

In one embodiment, an apparatus for detecting motion in an environment is disclosed. The apparatus includes, in part, a transmitter, one or more receivers, a memory, and at least one processor coupled to the transmitter, the one or more receivers and the memory. The at least one processor is configured to transmit a radio frequency signal, receive a composite signal including a plurality of backscatter signals. The plurality of the backscatter signals correspond to a reflection of the radio frequency signal from one or more objects in the environment. The one or more objects include at least one moving object and one or more static objects. The at least one processor is further configured to detect the at least one moving object in accordance with the composite signal.

In one embodiment, an apparatus for tracing motion is disclosed. The apparatus includes, in part, one or more receivers, a memory and at least one processor coupled to the one or more receivers and the memory. The at least one processor is configured to receive information corresponding to one or more moving objects from one or more devices. The information comprises one or more parameters corresponding to one or more backscatter signals being reflected from the one or more moving objects. The at least one processor is further configured to estimate location of at least one of the one or more moving objects in accordance with the received information from the one or more devices.

In one embodiment, a non-transitory processor-readable medium for detecting motion in an environment is disclosed. The non-transitory processor-readable medium includes, in part, processor-readable instructions configured to cause one or more processors to transmit a radio frequency signal and receive a composite signal comprising a plurality of backscatter signals. The plurality of the backscatter signals correspond to a reflection of the radio frequency signal from one or more objects in the environment. The one or more objects include at least one moving object and one or more static objects. The processor-readable instructions are further configured to cause the one or more processors to detect the at least one moving object in accordance with the composite signal.

In one embodiment, a non-transitory processor-readable medium for detecting motion in an environment is disclosed. The non-transitory processor-readable medium includes, in part, processor-readable instructions configured to cause one or more processors to receive information corresponding to one or more moving objects from one or more devices. The information includes one or more parameters corresponding to one or more backscatter signals being reflected from the one or more moving objects. The processor-readable instructions are further configured to cause the one or more processors to estimate location of at least one of the one or more moving objects in accordance with the received information from the one or more devices.

DETAILED DESCRIPTION OF THE INVENTION

Certain embodiments accurately trace fine-grained motion using radio-frequency (RF) signals, such as WiFi signals. In one embodiment, a motion detection and/or tracing system can be integrated into WiFi transceivers. One embodiment detects and traces motion while WiFi transceivers are naturally transmitting packets for communication. Therefore, tracing functionality may be piggybacked on existing WiFi signals and use existing WiFi spectrum without compromising communication or throughput. One embodiment is capable of tracing independent motion of multiple objects. One embodiment is capable of detecting and tracing motion of one or more people that independently perform sets of fine-grained movements. Therefore, according to one embodiment, radio frequency transceivers, such as WiFi transceivers can be used as accurate, occlusion resistant, high resolution motion cameras capable of working in low light or dark conditions.

A motion tracing camera, according to one embodiment, uses radio frequency signals to detect motion. In one example, the radio frequency signals may act as a light source for the motion-tracing camera. The motion tracing camera is capable of accurately tracing a free-form motion of small objects such as human hands. The motion tracing camera as described herein can be used in gesture recognition applications, security applications, tracing human motion behind walls, or through smoke and fire, or any other applications. In addition, the motion tracing camera may be used in navigation systems for blind or elderly people, alerting them to other people/objects that might be coming from their side or their backs.

FIG. 1 illustrates an example home scenario, in which radio signals (e.g., WiFi signals) are scattered by objects, according to one embodiment of the present invention. In this example, a motion tracing device 102 including a WiFi radio (e.g., a Wi-Fi access point (AP)) is located close to a computer monitor 104 in a study room. In one example, hand movements of person A and person B who are located in the living room are traced. The living room is separated from the study room by a wall. There is a strong reflector (e.g., the computer monitor 104) close to the motion tracing device 102. The WiFi AP is being used for accessing the Internet, which is for example a 4-antenna 802.11ac AP. The rays in FIG. 1 show some of the backscatter reflections that arrive at the AP when it transmits a packet and the signals reflected from the objects in the home, including hands of person A and person B.

As illustrated in FIG. 1, the AP receives backscatter reflections from a nearby reflector (e.g., the monitor), as well as the faraway reflectors, such as hands of person B. Due to the difference in distance, as well as the fact that faraway backscatter signal has to reflect off or travel through walls, there is a considerable difference in signal strength between the two backscatter components. As described below, one embodiment provides a technique to capture and/or estimate weak backscatter signals. As illustrated in FIG. 1, the AP receives many backscatter reflections, out of which only a few correspond to reflections from the moving objects. The reason is the good propagation properties of WiFi frequencies and the abundance of reflectors in indoor environments. Many objects such as drywalls, tables, chair, laptops and floors reflect signals at the 2.4 GHz and 5 GHz frequencies. The challenge is to identify the backscatter signals that are reflected from the moving objects amongst these multitude of backscatter components.

Figure 2:
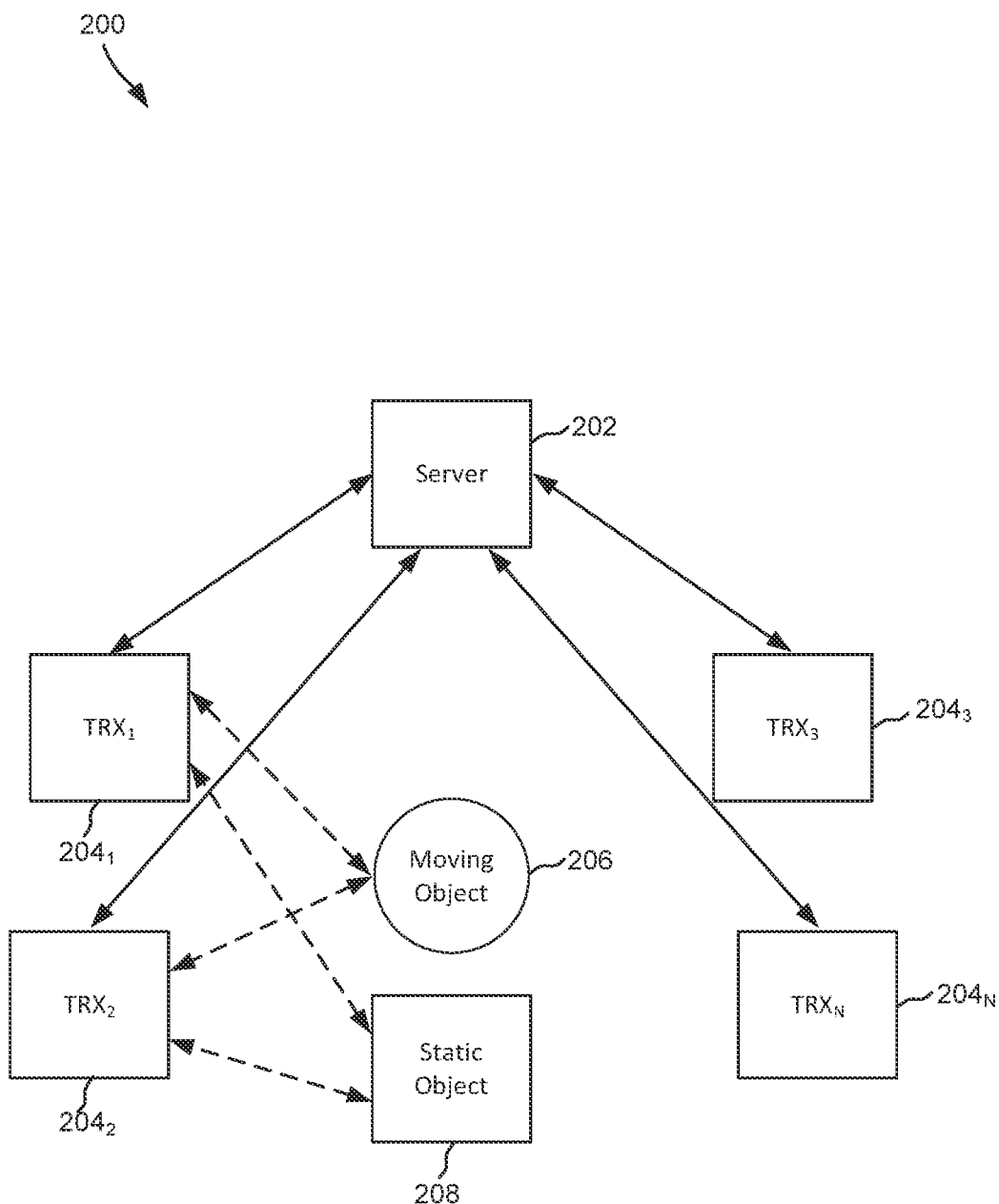
FIG. 2 illustrates an example object detection system, according to one embodiment of the present invention.

FIG. 2 illustrates an example motion detection/tracing system, according to one embodiment. As illustrated, the motion detection/tracing system may include a server 202 and N transceivers $204_1$ through $204_N$. In general, the motion detection system may include one or more transceivers. In one example, four WiFi transceivers that are capable of tracing and tacking motion may be disposed in a room. Each of the transceivers may transmit a radio frequency signal and receive backscatter signals from objects in the environment. For example, one or more moving objects 206 and one or more static objects 208 may be located in the environment that reflect the radio frequency signals transmitted by the transceivers $204_1$ through $204_N$. According to one embodiment, each of the transceivers may process a composite signal that receives through its receive antenna(s). In general, each of the transceivers may include one or more transmit/receive antennas. The transceivers may estimate parameters corresponding to the moving object 206 and send the estimated parameters to server 202 for more processing. In one embodiment, server 202 isolates the backscatter generated by moving objects, and traces the motion after combining the measurements from all the transceivers. In general, each of the server and/or transceivers may be able to trace and track movement of the moving object 206.

Figure 3:
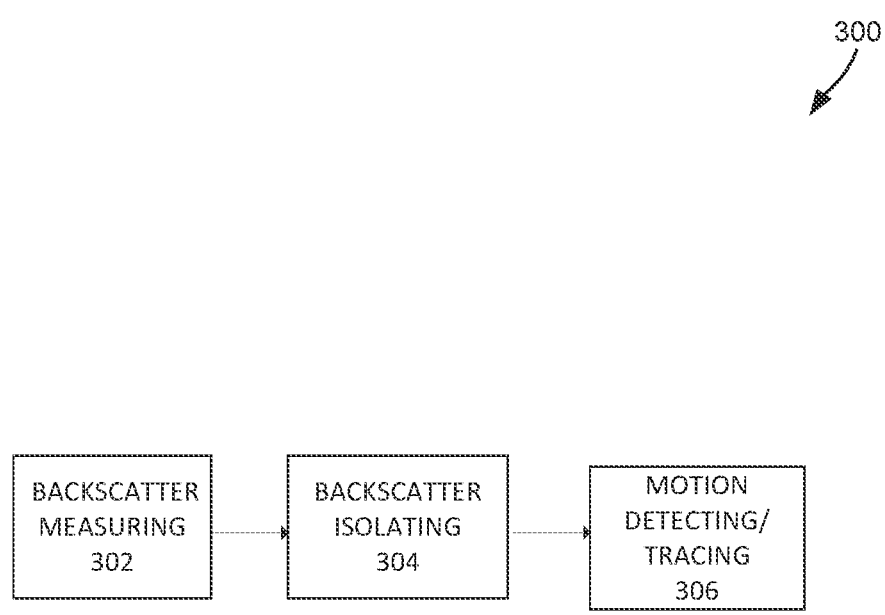
FIG. 3 illustrates an example high level block diagram of a motion tracing device, according to one embodiment of the present invention.

FIG. 3 illustrates an example high-level block diagram of a motion detection and/or tracing system 300, according to one embodiment. As illustrated, the motion tracing system may include a backscatter measuring block 302, a backscatter isolating block 304, and a motion detecting block 306. The backscatter measuring block 302 measures each backscatter reflection of radio frequency transmissions individually. One embodiment enables the radio to isolate most of the reflections of its WiFi transmission from the environment. In addition, the radio measures/estimates attenuation and/or delay from time of transmission and/or angle of arrival (AoA) of each backscatter reflection. The backscatter isolating block 304 isolates backscatter signals that are reflected from moving objects from other backscatter signals that are reflected by stationary objects. For example, backscatter reflections may arise from different static objects such as walls, furniture, computers, and the like, as well as moving objects, such as people. The motion detecting block 306 uses a novel algorithm to detect and trace the actual motion that caused the specific backscatter reflections corresponding to the moving objects.

Several challenges need to be addressed in a motion tracing device using radio signals. For example, practical radio frequency transmitters usually have limited dynamic range and limited bandwidth. Dynamic range refers to the ratio of the power of the strongest to the weakest signal that can be received at the same by a radio. In a common scenario, a static reflector may be located close to the receiver and a moving reflector of interest may be located further from the receiver. Backscatter signals reflected from the nearby reflectors may be stronger than the backscatter signals reflected from far away moving objects by more than the dynamic range of the radio. Therefore, backscatter signals reflected from the nearby reflectors may drown the backscattered signals from the faraway moving objects and render them unmeasurable or difficult to measure. In addition, limited bandwidth means that the digital samples (e.g., output of the ADC) are spaced apart in time. For example, a 100 MHz ADC will produce samples that are 10 ns apart. RF signals travel around 10 feet in 10 ns, therefore, if there are two reflectors within 10 feet of each other, the receiver may not even be able to receive digital samples that are spaced within those reflections. In one embodiment, novel progressive backscatter cancellation techniques and compressed sensing-based estimation algorithms are used that accurately measure each backscatter component in spite of the limited dynamic range and bandwidth of practical transceivers.

A second challenge in designing a motion tracing device using radio signals is isolating the backscatters that are coming from the moving objects. In general, the backscatter from the moving reflector is subsumed within a sea of backscatter from the multitude of reflectors that exist indoors (walls, tables, laptops, etc.). To be able to detect and/or trace motion, one embodiment isolates the backscatter that corresponds to the moving reflector. A novel motion detection algorithm, according to one embodiment, exploits the fact that backscatter signal reflected from the static reflectors do not change over time and are highly correlated. By eliminating the backscatter signals that are highly correlated over time, the moving reflector's backscatter can be isolated.

It should be noted that the isolated backscatter signal from moving reflectors is often indirect. In other words, it is unlikely that the backscatter reflections from the moving object arrive straight back at the transmitting WiFi radio. Inevitably, due to the small surface area of these reflectors (e.g., hands) and varying angles, the backscatter further reflects off other objects (e.g., walls etc.) before it arrives at the radio. A novel motion tracing algorithm, according to one embodiment, starts with a hypothesis of determining what motion could have produced these sequence of indirect backscatter from the moving reflector, accounts for the bias that is introduced from multiple reflections and iteratively refines the actual motion hypothesis until it accurately fits the observed backscatter, thus tracing the original motion. In one embodiment, the motion tracing algorithm uses a Kalman filter.

The present disclosure builds on recent work on measuring full duplex backscatter, application No. PCT/US2014/065814, entitled "Backscatter Estimation Using Progressive Self Interference Cancellation," detail of which is incorporated by reference herein. While similar algorithms are used to measure backscatter, one embodiment further refines these algorithms. In addition, novel motion isolation and tracing algorithms are used to trace fine-grained motion.

One embodiment measures one or more parameters corresponding to the backscatter components (and specifically of the moving objects of interest), in addition to identifying and isolating these backscatter components. These parameters may include strength of backscatter signals, relative delay from the time the signal was transmitted to when the backscatter signal arrived at the AP, and the angle of arrival (AoA) at which the backscatter signal reaches the AP. Armed with this information about the backscatter signals that are reflected from the moving objects, one embodiment, traces the actual motion that produces the corresponding backscatter over time. Often the moving objects of interest (such as hands) are small and the backscatter reflections may not have a direct line of sight (LOS) path to the AP. So, the reflections from these objects further get reflected off of walls and other objects before arriving at the AP. In other words, the backscatter is indirect. The challenge is to discern the original motion that could have produced a measured pattern of indirect backscatter signals.

In addition, human motion is typically not a single moving object. For example, when someone's hand moves, his forearm and shoulder move in a coordinated fashion. Each of these limbs reflect signals independently. However, backscatter signals corresponding to these limbs are clearly borne out of a single human motion. Hence, according to one embodiment, the tracing algorithm discerns that all of the backscatter components are coming from a single coordinated human limb movement and declares the original motion. One embodiment is capable of tracing multiple human motions at the same time, whether the movement comes from a single person moving two limbs or different people moving their limbs. Therefore, the tracing algorithm as described herein is capable of detecting and tracing multiple movements that are occurring at the same time.

Figure 4:
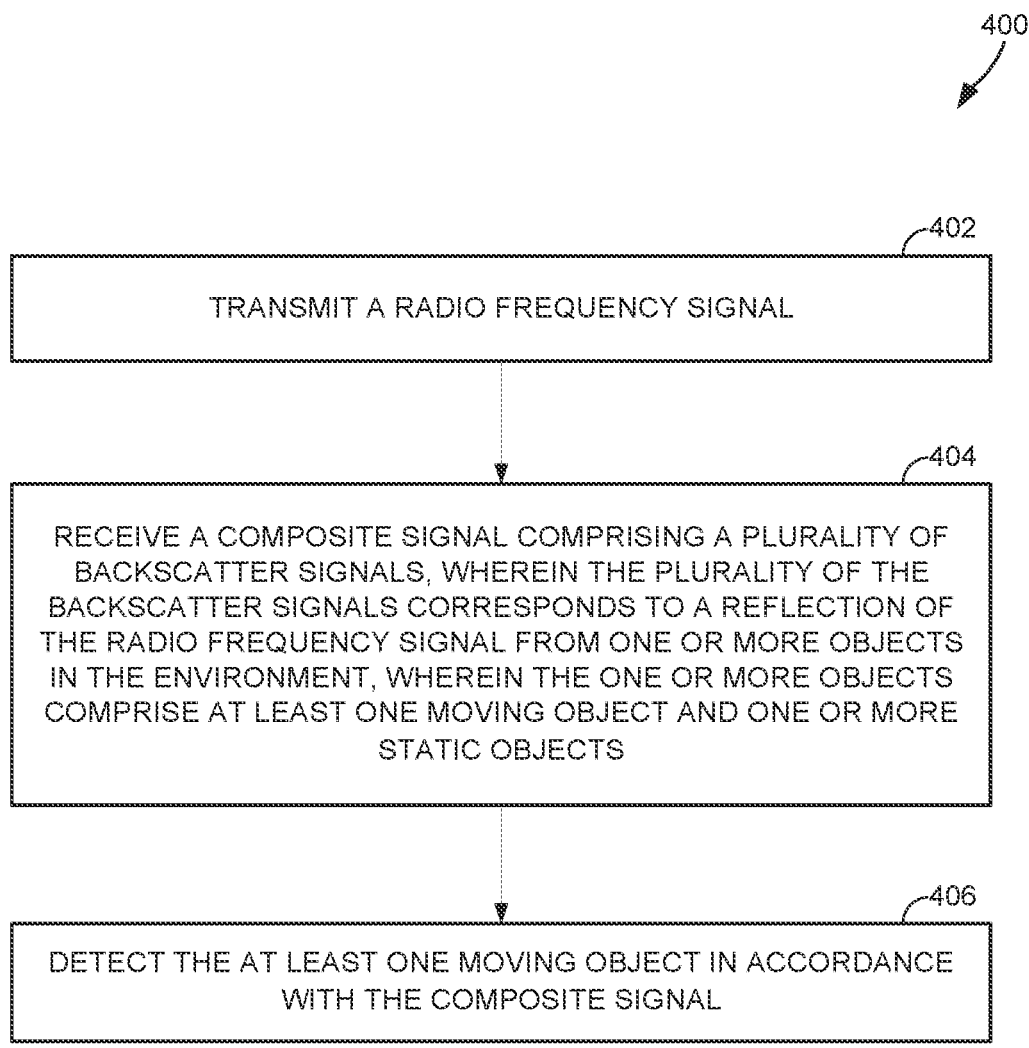
FIG. 4 illustrates an example block diagram of a motion detection/tracing system, according to one embodiment of the present invention.

FIG. 4 illustrates example operations that may be performed by a motion detecting/tracing device, according to one embodiment. At 402, the motion detecting device transmits a radio frequency signal. At 404. The motion detecting device receives a composite signal. The composite signal includes a multitude of backscatter signals. The backscatter signals correspond to a reflection of the radio frequency signal from one or more objects in the environment. The one or more objects include at least one moving object and one or more static objects. At 406, the motion detecting device detects the at least one moving object in accordance with the composite signal.

Figure 5:
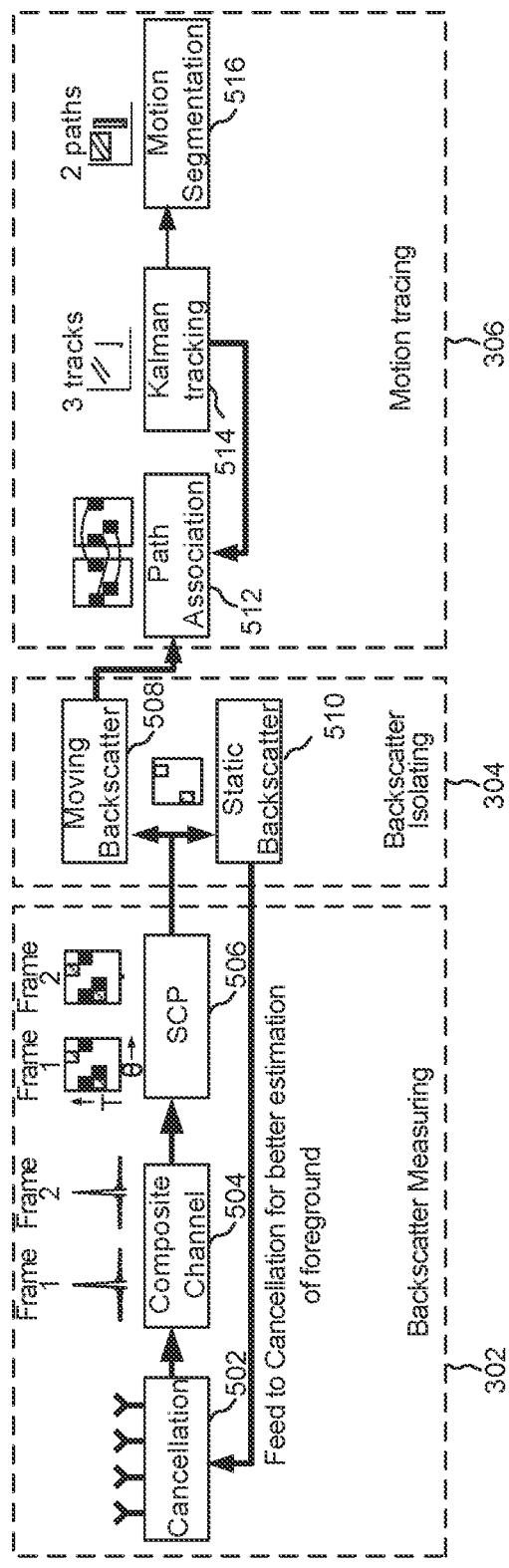

FIG. 5 illustrates an exemplary block diagram of the motion detecting/tracing device, according to one embodiment of the present invention. FIG. 5 illustrates elements of the motion detecting/tracing device of FIG. 3 in more detail. The motion detecting/tracing device receives the backscatter signal, accurately estimates the components of the backscatter, isolates the components due to moving object, and finally traces the motion. The backscatter measuring block 302 may include a cancellation block 502, a composite channel estimation block 504, and a Sequential Convex Programming (SCP) block 506. The backscatter isolating block 504 may include a moving backscatter block 508 and a static backscatter block 510. Furthermore, the motion detecting block 306 may include a path association block 512, a Kalman tracking block 514, and a motion segmentation block 516. Each of these blocks are explained in detail below.

One embodiment provides accurate backscatter measurement even when using practical transceivers by designing two novel techniques to tackle the limitations of low dynamic range and finite bandwidth available in these transceivers. Assume that the radio frequency transceiver (e.g., WiFi radio) is transmitting a signal x(t). Also, there may be N backscatter reflections of the transmitted signal arriving back at the radio whose parameters are given by $(\alpha_1, \tau_1, \theta_1), \ldots, (\alpha_n, \tau_n, \theta_n)$ where $\alpha_i$ represents the attenuation undergone by the $i^{th}$ backscatter component, $\tau_i$ represents the delay since the signal was transmitted, and $\theta_i$ represents the angle of arrival of the signal at the radio. For mathematical brevity, the angle of arrival (AoA) parameter is omitted in describing the basic problem in this section. Also, it is assumed that the radio has a single antenna. However, the problem statement can be easily extended to include the AoA parameter and multiple antennas, without departing from the teachings of the present disclosure. Hence, the overall signal that is arriving at the radio's antenna y(t) is given by:

$$y(t) = \sum_{i=1}^{N} \alpha_i x(t - \tau_i) \quad (1)$$

In one embodiment, the reflected backscatter signals are received back at the radio. The RX chain of the radio is tuned to the same carrier frequency as the transmission. Bandwidth of the RX chain may be dictated by the sampling rate of the ADC (e.g., a 200 Msps ADC would imply trying to receive a 100 MHz signal). In one embodiment, RX chain of the radio down-converts the received signal to analog baseband, applies a low pass lter of bandwidth B corresponding to half the ADC sampling rate and then digitizes the signal. This process of ltering to a particular bandwidth B can be modeled as convolution with a filter of bandwidth B. The time domain response of a rectangular filter of bandwidth B is a sinc pulse. So, the overall signal received at baseband $y_B(t)$ can be written as follows:

$$y_B(t) = \left(\sum_{i=1}^{N} \alpha_i x(t - \tau_i)\right) \otimes sinc(B(t)) \quad (2)$$

In one embodiment, this baseband analog signal is sampled by the ADC to produce the discrete time signal $y_B[n]$, as follows:

$$y_B[n] = \left(\sum_{i=1}^{N} \alpha_i x(nT_s - \tau_i)\right) \otimes sinc(B(nT_s)) \quad (3)$$

where $T_s$ is the sampling interval. The equation can be rewritten in terms of a sum of channel responses of each backscatter reflector as follows:

$$y_B[n] = \left(\sum_{i=1}^{N} \alpha_i sinc(B(nT_s - \tau_i))\right) \otimes x[n] \quad (4)$$

The term in the parenthesis can be viewed as the total system through which the transmitted signal is passing. This includes the backscatter channel, which can be viewed as sum of impulses, and the lters at the transmit/receive chain which can be viewed as a channel with impulse response sinc(B(t)). Hence, the total channel through which the transmitted signal passes is sum of appropriately weighted and shifted sinc signals, as illustrated in FIGS. 6A-6C.

Figures 6A, 6B, 6C:
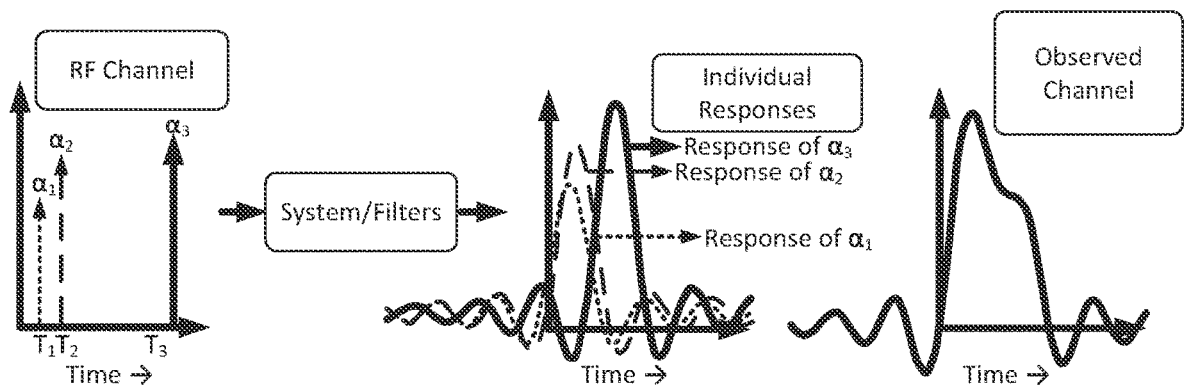
FIGS. 6A, 6B and 6C illustrate an example backscatter channel composed of three impulses, according to one embodiment of the present invention.

FIGS. 6A-6C illustrate example backscatter channel according to one embodiment of the present invention. In the example illustrated in FIGS. 6A and 6B, the backscatter channel is composed of three impulses. Parameters $(\alpha_1, \tau_1, \theta_1), \ldots, (\alpha_3, \tau_3, \theta_3)$ corresponding to each of the backscatter impulses should be estimated. However, only the combined channel response, as illustrated in FIG. 6C is available. In the above equation, the device knows the transmitted signal x[n] and the received signal $y_B[n]$. From these two variables, the overall channel response h[n] can be calculated using classic channel estimation techniques based on preambles and pilots. The overall channel response is related to the individual backscatter components, as follows:

$$h[n] = \left(\sum_{i=1}^{N} \alpha_i sinc(B(nT_s - \tau_i))\right) \quad (5)$$

The above equation summarizes the backscatter measurement problem. Individual backscatter components should be estimated, even though only the overall response h[n] is known. This is an extremely under-constrained problem, since there are many more unknowns than equations. In one embodiment, the problem in Eqn (5) is casted as a sparse optimization problem based on the physical intuition that in any environment there are typically only a few reflectors (on the order of tens) rather than hundreds. Hence, the number of backscatter components arriving at the AP at any point is a relatively small number. In one embodiment, adding this additional constraint of finding the sparsest number of backscatter components that can produce the overall response, leads to an optimization problem, as follows:

$$\text{minimize } \Sigma_n(h[n]-\Sigma_k\alpha_k\text{sinc}(B(nT_s-\tau k)))^2+\lambda_r|\alpha|_0$$

$$\text{subject to } \tau_k \geq 0, \alpha_k \leq 1,$$

$$k=\{1,\ldots,L\}, n=\{-N,\ldots,N\}, \quad (6)$$

The above optimization problem is non-linear because the sinc terms in the optimization problem are non-linear. Further, the problem is not convex. One embodiment solves this channel estimation problem using a piece-wise technique. In one example, the mon-linear optimization problem may be solved in the composite channel estimation block 505, as illustrated in FIG. 5. For solving the non-linear optimization problem, first, a small region in the variable space $\delta\tau$, $\delta\alpha$, $\delta\theta$ is focused on. The sinc functions are approximated in that region by straight lines, and the resulting convex optimization problem is solved. Next, the residual error is compared and the process is repeated until successive iterations of the algorithm does not reduce the error any further. Solving the above general problem however leads to two challenges stemming from the limitations of radio hardware, which will be discussed next.

In general, some of the reflections in the backscatter may be significantly stronger than others. For example, if there is a reflector 10 cm away from the transmitter and another 10 m away, the difference in signal strengths of these two components can be as high as 60 dB. Practical WiFi transceivers have a typical dynamic range of 60 dB, which would imply that the weaker reflection would get completely buried. Second, even if the weaker reflection is within the dynamic range, it is not being represented with many bits and hence there might be higher quantization noise. While the strong components can be estimated reasonably accurately, the weaker components may not be and inevitably this leads to inaccurate backscatter parameter estimation. One embodiment improves accuracy of the estimation by progressively removing the strongest backscatter component and allowing the estimation algorithm to operate on the remaining components, as shown in FIGS. 7A through 7D.

Figure 7A:
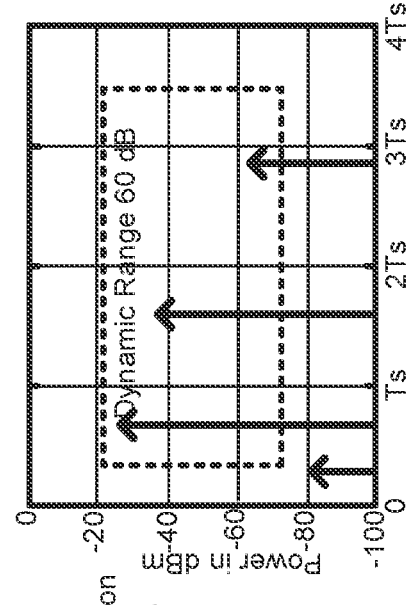
FIGS. 7A through 7D sequentially illustrate intermediate results of an estimation of the backscatter signal after performing the progressive self-interference cancellation, according to one embodiment of the present invention.
Figure 7B:
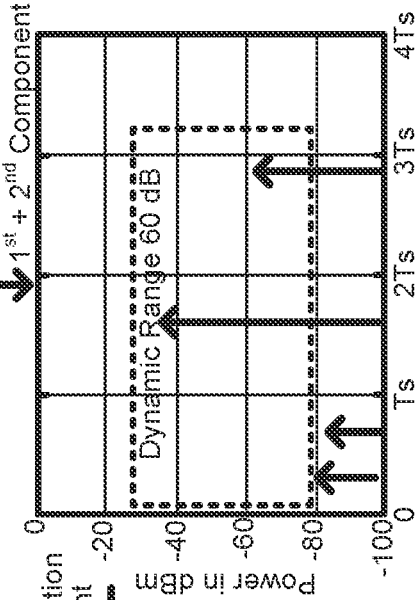
Figure 7D:
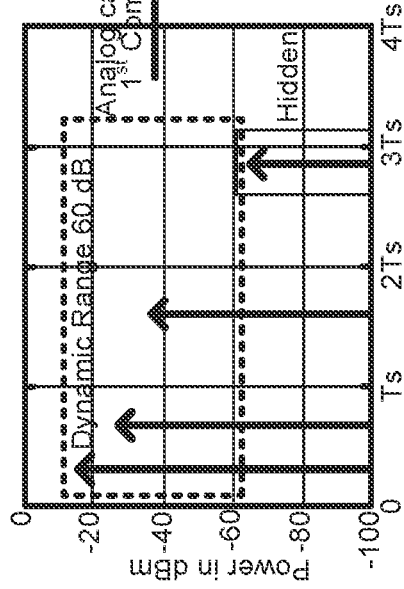
Figure 7C:
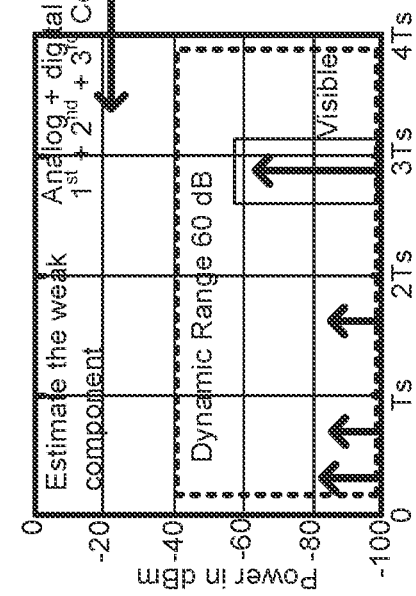

FIGS. 7A through 7D sequentially illustrate intermediate results of an estimation of the backscatter signal after performing the progressive self-interference cancellation according to one embodiment of the present invention. As illustrated, by removing the stronger components as illustrated in FIG. 7A, dynamic range of the receiver can be used to sample the weaker components with higher resolution and thus prevent them from being washed out or distorted (as shown in FIG. 7B). When components are estimated, the strongest of the remaining components is removed, and the estimation algorithm is run on the remaining backscatter signals. The algorithm recursively repeats until all components are estimated (as illustrated in FIGS. 7C and 7D).

One embodiment progressively cancels strong backscatter components and improves the accuracy of estimation for the remaining components. The challenge therefore is to selectively eliminate backscatter components by canceling them. In one embodiment, the cancellation is implemented in analog before the receiver, since otherwise dynamic range will be limited. To implement this, the authors build on prior work in self-interference cancellation and full duplex, as filed in Application No. 61/864,492, entitled "Full Duplex Radio," detail of which is incorporated herein in its entirety. The analog cancellation circuit design in this prior work is modified to cancel the backscatter components (e.g., interference) in a controlled manner one by one. One embodiment uses the initial estimates to find a coarse estimate of where the strong backscatter components are located. The analog cancellation circuit is then tuned to only cancel these components by controlling the delay taps in the circuit to straddle the delay of these strong components. After running the estimation algorithm on the remaining backscatter signals, the analog cancellation circuit is retuned to cancel the next strongest component and repeat the process. In the rest of the present disclosure, this cancellation technique is referred to as Progressive self-Interference Cancellation (PIC).

In one embodiment, after PIC cancellation, the remaining backscatter signal components can be estimated. Further, similar cancelling and estimation procedures can be performed in digital domain by selectively canceling the residual backscatter components using the digital cancellation algorithms.

In general, closely spaced reflections of the transmitted signal may lead to a degenerate system of equations. For example, when the reflections at two delays $\tau_1$ and $\tau r_2$ are closely spaced, the difference in sample values of the corresponding sinc functions are very small and therefore the observations are highly correlated. As more reflections are closely spaced within a sampling period, the problem of uniquely reconstituting the reflections becomes more difficult. Consequently, reconstruction error increases since the optimization algorithm struggles to find a good fit. In one embodiment, even if there were two very closely spaced reflectors in time (i.e., the relative delays from the transmitter to the two reflectors were within a sampling period of each other), they could still be deconstructed accurately as long as their spatial orientations relative to the transmitter are slightly different (i.e., their backscatter signals have different AoAs).

The basic idea can be visualized as follows. In one example, a radio has four antennas and the two closely spaced reflections are arriving at angles $\theta_1$ and $\theta_2$ respectively. The two reflections can be distinguished in the spatial dimension because they exhibit different phases at the different antennas. The reason is that because of the different angles of arrival, the two reflections travel different distances which translates to a phase difference across successive antennas. In one embodiment, by incorporating this constraint into the optimization problem, closely-spaced reflections can be disentangled within a single sampling period. In one embodiment, up to 4 closely spaced reflections can be distinguished within a single sampling period. In effect, one embodiment achieves the same performance as an ADC that has four times the sampling bandwidth of its radio, while still using inexpensive commodity transceivers.

Formal Mathematical Model

In this section a brief description of the formal mathematical model, according to one embodiment is provided. The composite backscatter channel as seen by the $m^{th}$ receiver in a MIMO antenna array can be modeled as follows:

$$h_m[n] = \sum_k \alpha_k e^{i(v_k+\gamma mk)} \text{sinc}\left(B\left(nT_s - \left(\tau_k + \frac{\gamma mk}{2\pi fc}\right)\right)\right) \quad (7)$$

where $$\gamma_{mk} = \frac{2\pi}{\lambda}(m-1)d\sin\theta_k$$

is the added phase shift experienced by the $k^{th}$ reflection at the mth receiver relative to the first receiver when the reflected signal arrives back at $\theta_k$ AoA, $\alpha_{ke}{}^{ivk}$ is the complex attenuation for the $k^{th}$ reflection, and $\tau_k$ is its corresponding delay. The constant $f_c$ is the carrier frequency with wavelength of $\lambda$, and d is the distance between the successive receiving antennas in the array. Theoretically, $h_m[n]$ can be of infinite length, but in practice the sinc function decays to very small values for large values of n. Thus, the channel can be modeled by a finite-length vector with n having value in the range of [−N, N].

In one embodiment, the composite nite-length linear channel $h_m[n]$ can be estimated by de-convolving the received samples with known preamble samples. Once the composite linear channel has been estimated, the parameters of the constituent backscatter components can be estimated by solving the following optimization problem:

$$\text{minimize} \sum_m \sum_n \|h_m[n] - \tilde{h}_m[n]\|^2 + \lambda_r |\alpha|_1 \qquad (8)$$

subject to $\tau_k \geq 0, \alpha_k \leq 1$, $\theta_k \in [\frac{-\pi}{2}, \frac{\pi}{2}], v_k \in [0, 2\pi]$, $k = \{1, \ldots, L\}, n = \{-N, \ldots, N\}$, $m = \{1, \ldots, M\}$ where $\tilde{h}$ is the estimated linear channel response obtained by the de-convolution of received samples with a known preamble, M is the number of antennas in the array, and L is the total number of reflected backscatter components, $\lambda_r$ is the regularization coefficient chosen to be a positive number. In one embodiment, the combinatorial objective $|\alpha|_0$ due to $l_0$ norm in equation 6 is replaced with the convex relaxation $|\alpha|_1$ using $l_1$ norm in the above formulation.

This optimization problem is non-convex and is not known to have a global solution. Instead, in one embodiment, this problem is solved approximately by finding a locally optimal solution. In one embodiment, a heuristic known as Sequential Convex Programming (SCP) is used in the SCP block 506 as illustrated in FIG. 5. In the SCP algorithm, all the non-convex functions are replaced by their convex approximation. The resulting convex problem is then solved in an iterative manner until a reasonable solution is achieved. One simple approach to convert Eqn. (8) into a convex problem, according to one embodiment, is to approximate Eqn. (7) by a linear function. It should be noted that a more sophisticated convex-approximation of Eqn. (7), or any other method could also be used to improve overall accuracy of estimation without departing from the teachings of the present disclosure.

Due to a limited dynamic range of the ADC in typical receivers, stronger backscatter components may mask the weaker components. In one embodiment, in the initial step, the algorithm finds the parameters corresponding to the strong backscatter components and then passes that information to the progressive self-interference cancellation (PIC) block. The PIC block will cancel these reflections, which allow the receiver AGC to increase gain for the weak backscatter components which can now become detectable due to the cancellation of the strong reflections. In one embodiment, the estimation algorithm is run again to estimate the parameters of the weak components and send back that information to PIC for further cancellation.

In practice, the backscatter components are weaker for larger values of delay $\tau$. Hence, in one embodiment, the estimation algorithm can be run by partitioning the range for the variable $\tau$ into several non-overlapping windows. In one embodiment, the algorithm begins by estimating parameters for the reflections in the first time window then passes that information to the PIC. After cancellation of these components, advance the window one step into the future and then estimate the parameters in that range and pass that information to PIC for cancellation. This process can repeat multiple times until all the backscatter components are detected in the forward time direction. In one embodiment, a reasonably high value can be set for $\tau$ beyond which the remaining backscatter components are very weak. This maximum value may depend on the application and the environment. The estimation process may be described in the Algorithm 1, as follows:

---

Algorithm 1: Progressive steps in backscatter channel parameters estimation

---

1. Begin in the first time window $w_0$
2. Estimate parameters $\alpha, \tau, \theta$ for reflectors in window $w_0$ by solving the optimization problem given by Eqn. 8
3. repeat
4.     Pass the estimated parameters of all reflectors in the past windows $w_{p-1...}\ w_0$ to analog PIC block for cancellation
5.     Estimate parameters $\alpha, \tau, \theta$ for reflectors in the current window $w_p$ by solving the optimization problem given by Eqn. 8
6.     Advance window to $w_{p+1}$
7. until Parameters for reflectors in the last window $w_P$ has been estimated by forward estimation

---

Isolating Backscatter from Moving Objects

Measuring and estimating backscatter via the algorithm described in the previous section generates a set of parameters (amplitude, delay, AoA) for each backscatter component that is reflecting and arriving back at the transceiver. The majority of these reflections are from static objects that are not moving and hence act as noise to the motion tracing algorithm. Referring back to FIG. 5, the backscatter isolating block 810 identifies and eliminates this static background by isolating the static backscatters into the static backscatter block 810 and feeding information corresponding to the static objects into the cancellation block 502 to remove them from the composite received signal. The backscatter isolating block 304, further isolates the backscatter components that are generated by moving objects into the moving backscatter block 508.

One embodiment models the backscatter components and their corresponding parameters as image frames. At each time step, the motion detecting device forms a three dimensional image frame (with the three backscatter parameters such as delay, AoA and amplitude as the axes), where each pixel in the frame corresponds to one backscatter component arriving at the AP. As multiple measurements are made by the motion detecting device over time, a sequence of frames is generated, as illustrated in FIGS. 8A through 8C.

Figures 8A, 8B, 8C:
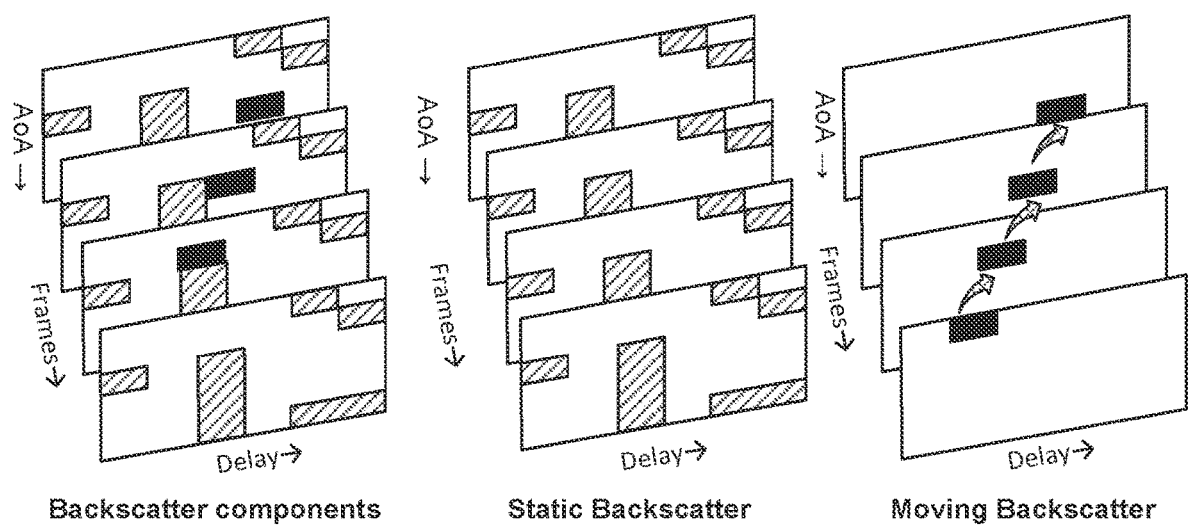
FIGS. 8A, 8B and 8C illustrate example backscatter components obtained from a simulated hand movement in a typical indoor scenario using a Wireless tracing software, according to one embodiment of the present invention.

FIGS. 8A through 8C illustrate example backscatter components obtained from a simulated hand movement in a typical indoor scenario using a Wireless tracing software, according to one embodiment of the present invention. In this figure, the backscatter components collected in each time interval are presented as image frames. The horizontal and vertical axes correspond to delay and AoA, respectively. Different brightness of each pixel corresponds to its amplitude (power in dBm). Therefore, each colored pixel corresponds to a backscatter component. Different frames stacked one over the other correspond to set of backscatter components obtained in consecutive time intervals. The majority of backscatter components are contributed by static environment, which are shown in the same color to provide contrast with moving backscatter.

In one embodiment, one frame may be collected after every predefined amount of time, which can be tuned. In one example, one frame is collected every 1 ms, which results in one thousand frames per second. The backscatter components of each frame are collected over data that is collected every millisecond assuming the transceiver is transmitting for at least some fraction of that millisecond. If the transceiver is not transmitting, then there is no backscatter to collect, in one embodiment, for the period in which transmitter does not transmit signals, an empty frame may be considered.

In one embodiment, by modeling backscatter as image frames, the problem of isolating backscatters can be modeled using video motion estimation techniques. In one embodiment, pixels that correspond to the same backscatter component (i.e., generated by the same backscatter reflector) are associated between every two successive frames. The association is performed even if the reflector moved between those two frames. To do so, according to one embodiment, a novel pixel association algorithm is used across frames based on minimizing the amount of change between consecutive frames.

In one embodiment, the pixel association algorithm starts by calculating a pairwise distance between every two pair of pixels in successive frames. Distance is defined as the absolute difference in the three parameters (amplitude, delay and AoA) squared and summed after appropriate normalization, as follows:

$$d(b_1, b_2) = w_\alpha(\alpha_1-\alpha_2)^2 + w_\tau(\tau_1-\tau_2)^2 + w_\theta(\theta_1-\theta_2)^2 \quad (8)$$

where $b_1$ and $b_2$ are the two backscatter pixels in successive frames and $\alpha$, $\tau$, and $\theta$ are the amplitude, delay and AoA respectively. The weights $w_\alpha$, $w_\tau$, and $w_\theta$ are inverse of the largest squared distance between pairwise amplitude, delay, and AoA, respectively, of the pixels in the two frames. Note that this metric can be calculated for all pairs of pixels, so there would be $n^2$ distances where n is the number of pixels in a frame. In one embodiment, specific pairings may be found between frames, where pixels in each pair of frames are generated by the same backscatter reflector.

It should be noted that for static objects, the pixels corresponding to backscatter reflections from that static object in successive frames should be at zero distance with respect to each other because by definition they did not move and the associated parameters did not change. Further, even for the pixels that correspond to motion, given how slow human motion is relative to the length of a frame (a millisecond), the distance between pixels in successive frames that correspond to the moving object could be small. In one embodiment, the pixels are paired up such that the overall sum of the distance metrics for these paired pixels is the minimum among all possible pairings.

Isolating Moving and Static Backscatter

Determining the right pixel association between successive frames may be modeled as a combinatorial assignment problem. Distances between all pairs of pixels are passed to the system as the input and a set of pairs that minimize the overall sum of distance metric among the pixels are selected. A naive algorithm would be to enumerate all possible assignment of pixel pairs, which would require evaluation of n! assignments for frames with n pixels. In one embodiment, a classic algorithm in combinatorial optimization known as the Hungarian algorithm is used to solve the pixel association problem. However, any other method may be used to find pixel pairs without departing from the teachings of the present disclosure. The Hungarian algorithm runs in polynomial time ($O(n^3)$), where n is the number of pixels.

A full description of the Hungarian algorithm is omitted for brevity, however, the Hungarian algorithm is best visualized in terms of a bipartite graph G=(F1, F2, E). In the bipartite graph, pixels from the rst frame are vertices in the set (F1) and pixels from the second frame are in the set (F2) and the edge set (E) consists of all possible edges between vertices in the two sets. The weight of each edge is the distance metric between the backscatter parameters corresponding to the pixels the edge connects. In one embodiment, a preferred matching with minimum cost is determined, as illustrated in FIG. 9B.

FIGS. 9A and 9B illustrate an example application of Hungarian algorithm for a subset of backscatter components, according to one embodiment of the present invention. FIG. 9A represents the backscatter components in two successive frames. The color of each pixel is a representation of the value of $\alpha$ (power in dBm), $\theta$ (in degrees), or $\tau$ (in ns) according to the appropriate row. A distance metric is defined between each component in the top frame and each component in the bottom frame. The distances that are obtained are represented as edges with appropriate weights. The matching with minimum weight may be found in the bipartite graph. Applying Hungarian algorithm results in the least weight matching presented in FIG. 9B, thus providing a way to associate backscatter components in the top frame with corresponding components in bottom frames.

In one embodiment, the set of associated pixels across frames can be used to identify the backscatter reflectors that are static, and the backscatter reflectors that are moving. For example, the backscatter components are separated into background components and foreground components as illustrated in FIGS. 8A-8C. In other words, the moving reflectors are identified and isolated to focus on tracing their motion. In addition, the static background objects that act as noise may be eliminated from consideration. In one embodiment, pairs of pixels whose distance metric is close to zero and remains close to zero for at least a predefined number of frames are identified. For example, if the distance metric is close to zero for about 100 frames, it corresponds to the reflectors that have been static for 100 ms. In one embodiment, when such pixels are found, they are declared to be part of the static background. These pixels may then be eliminated from the frames. In one embodiment, when the static pixels are identified and removed from frames, the only pixels left are those that the algorithm believes to be coming from moving reflectors.

The information about these static pixels is also passed to the backscatter measurement 302 and progressive interference cancellation block 502, described above. The measurement block uses this information to permanently cancel these components using progressive interference cancellation. Further updates from the backscatter measurement block 302 do not have information about these pixels in the frames, thus making detecting backscatter components corresponding to moving objects easier.

The static elimination step also naturally provides detection of a new movement that is starting. For example, a completely static environment can be assumed at first. In this example, in the steady state the backscatter measurement block wont report any parameters because eventually all of the components will be declared static and canceled by progressive interference cancellation. When a new motion starts and generates new backscatter components, the measurement block will report these parameters to the backscatter isolation block 304 which will classify them as moving pixels. Such pixels are grouped together and passed to the motion detecting block 306 as a new moving object that needs to be traced.

At this point, a set of frames are identified with pixels that correspond to moving objects. Further, pixels in successive frames are associated with each other via the Hungarian algorithm if they belong to the same backscatter reflector. The next step is to trace the original object and its motion which produced the frames with the moving pixels.

Referring back to FIG. 2, in one embodiment, one or more of the transceivers $204_1$ through $204_N$ send information corresponding to their detected frames to the server. For example, transceiver $204_1$ sends the frames that was computed in the previous step to the server. It should be noted that the server may not be physically separate from the transceivers. For example, in one embodiment, the server may be located in the same device as one of the transceivers. In general, each of the transceivers may have functionality to act as the server, without departing from the teachings of the present disclosure.

Whenever a new motion starts, it may be quite likely one or more transceivers in a neighborhood declare a frame with some moving backscatter. The server collects frames over a predefined period of (e.g., 100 ms) from all participating radio transceivers, and assumes that any moving backscatter detected by any of the transceivers are coming from the same object. In one embodiment, the heuristic implicitly makes the assumption that two new and independent motions won't start within an interval of, for example, 100 ms. In one example, considering human motion and the timescales at which human motion happens, 100 ms is a negligible amount of time and such asynchrony is very likely in practice. Note that this does not mean that two independent motions cannot be occurring simultaneously, one embodiment only makes the assumption that these motions don't start within 100 ms of each other.

The key challenge in tracing motion is that each moving object is likely to produce indirect backscatter because of their small sizes. After the signal reflects off a moving object, it may be quite likely that it reflects off another object (such as a wall) before arriving back at the transmitting radio. Hence, most of the backscatter measurements for a component do not correspond to a LOS path from the radio to the moving object.

Localizing the Centroid of the Motion

In one embodiment, the server 202 localizes the centroid of the motion that has just started. The server may receive measurements from one or more transceivers $204_1$ through $204_N$ across multiple frames. In one example, if there are N transceivers collecting measurements, the server picks N frames that were collected almost at the same time by the N transceivers. Each one of them has a backscatter component and the associated parameters ($\alpha$, $\tau$, $\theta$): amplitude, delay and AoA). The goal is to estimate location (x, y) of the moving object at a specific time.

Since backscatter at each radio can be indirect, the backscatter measurements have a constant bias in them. For example, if a backscatter reflection from a moving object is further reflected by a wall before arriving at the AP, the delay parameter will have a constant bias that reflects the extra time it takes to traverse the extra distance corresponding to going to the wall and reflecting off the wall. Similar bias exists for both the amplitude and AoA measurements. It should be noted that the bias values are unknown.

Given the above, in one embodiment, the server solves the following localization problem:

$$\text{minimize} \sum_{j=1}^{N} \sum_{i=1}^{M} \left[ (\overline{p}_i - p_{ij})^2 + (\overline{\tau}_i + b_{\tau_i} - \tau_{ij})^2 + (\overline{\theta}_i + b_{\theta_i} - \theta_{ij})^2 \right]$$

$$\overline{\tau}_i = \frac{dist(x, x_i)}{c}, \, b_{\tau_i} \geq 0$$

$$\overline{\theta}_i = AoAULA(x, x_i)$$

subject to $\overline{p}_{i=} p_{0i} - 10\gamma_i \log_{10}(dist(x, x_i))$ $\gamma i \geq 0, i = \{1, \ldots, M\}, j = \{1, \ldots N\}$ where M is the number of tracing transceivers, N is the number of backscatter frames that is being used for the localization, $p_{ij}$, $\tau_{ij}$, and $\theta_{ij}$ are the received power, delay, and the AoA respectively of the backscatter in the jth frame observed by the ith transceiver. The dist(x, $x_i$) is the Euclidean distance function between two points x and $x_i$, and AoAULA(x, $x_i$) is a function that gives the AoA seen by the tracing transceiver located at $x_i$ from a reflector located at x. The distance is converted to delay using speed of light $c=3\times10^8$ m/s. $p_{0i}$ is the reference power reflected by a known reflector located at a distance of 1 m, and $\lambda_i$ is the path loss coefficient of the environment. $b_{\tau i}$ and $b_{\theta i}$ are the bias added in the delay and AoA respectively due to multipath. In one embodiment, it can be assumed the bias values $b_{\tau i}$ and $b_{\theta i}$ remain the same for few frames as most of the moving objects (such as humans) are unlikely to move very far in a short timeframe. The basic intuition is to find the best fit for a location x that minimizes the above metric. Since the parameters $p_{0i}$, $\gamma_i$, $b_{\tau i}$ and $b_{\theta i}$ are also not known, they will be estimated along with the unknown location x.

In one embodiment, the optimization problem can use the data from several frames (i.e., a few milliseconds) given that a moving object (e.g., human) isn't likely to have changed location significantly in a few milliseconds. In one embodiment, the optimization problem provides a location, as well as an estimate for the bias of each parameter at each measuring transceiver. This bias estimation will be useful later in tracing motion. The above optimization problem is non-convex, therefore, in one embodiment, a heuristic known as sequential convex optimization may be used to solve it.

In one embodiment, it can be assumed that the location of the transceivers $x_i$ (e.g., motion tracing devices) that are measuring backscatter are known. To make this assumption, it can be assumed that there are at least a few transceivers (such as the APs) whose location is known a priori, and any other transceiver can then localize itself using standard localization algorithms.

Tracing Motion

Once the newly detected moving object is localized, the next step is to trace the motion as it moves. One embodiment builds a hypothesis about the motions that are occurring and progressively refines it. There are several parameters to that hypothesis such as initial position, velocity, direction of motion and bias in each backscatter parameter due to indirect reflections, and any other parameters. In one embodiment, both the bias and initial position variables are initialized using the output of the localization algorithm in the previous step. Velocity and direction of motion are then updated as new measurements become available. Note that the bias parameter may change over time, because when the object moves the bias for each parameter changes.

One embodiment uses a classic algorithm from estimation theory (e.g., Kalman filter) for estimating these parameters and updating them in block 514, as shown in FIG. 5. The Kalman filter works as follows: at every step compares its prediction of where the pixel should have been given its estimates of velocity, direction and bias, and where it actually is in the frame of each measuring radio. Kalman filter uses the error to update its estimates. In one embodiment, the motion is represented by the following dynamic model:

$$x_{k+1} = A_k x_k + w_k, \; w_k \sim N(0, Q_k) \quad (11)$$

$$y_k = C(x_k) + v_k, \; v_k \sim N(0, R_k)$$

$$A_k = \begin{bmatrix} A & 0 \\ \hline 0 & I \end{bmatrix}, \; A = \begin{bmatrix} 1 & 0 & \delta T & 0 \\ 0 & 1 & 0 & \delta T \\ 0 & 0 & 1 & 0 \\ 0 & 0 & 0 & 1 \end{bmatrix},$$

where $x_k$ is the state vector at frame k which consists of terms $x_k = [x_k \; y_k \; \dot{x}_k \; \dot{y}_k \; b_{\theta_k} \; b_{\tau_k} \; p_{0k} \; \gamma_k]^T$, where $x_k$ and $y_k$ are the x and the y coordinate; and $\dot{x}_k$ and $\dot{y}_k$ represent the velocity in x and y direction of the human; and $b_{\theta_k}$, $b_{\tau_k}$, $p_{0k}$, and $\gamma_k$ are the bias in AoA, bias in delay, the reference power and the path loss coefficient respectively. The matrix $A_k$ helps to update the state between frames, where 0 is the zero matrix; I is the identity matrix and $\delta T$ is the time interval between the frames; $w_k$ is the random variable representing the modeling error with $Q_k$ as its co-variance matrix; $y_k$ is the observation that consists of the measurement quantities power, delay, and AoA.

It should be noted that these observations are not linear function of the state variable $x_k$. Therefore, in one embodiment, extended Kalman filter is used to trace the motion. $v_k$ is the random variable indicating the measurement errors with co-variance matrix $R_k$. Additionally, Kalman filter is also used to associate backscatter parameters pertaining to moving objects between the frames. The major update steps of the extended Kalman filter is given in Algorithm 2, as follows:

---

1. Begin Initialize Kalman filter using the location and bias computed by the localization algorithm
2. repeat
3. Kalman propagation $\hat{x}_k^- = A_{k-1} \hat{x}_{k-1}^-$,
   $P_k^- = A_{k-1} P_{k-1}^+ A_{k-1}^T + Q_{k-1}$
4. Linearize C: Linearize and non-linear function C around the previous state variable $\hat{x}_k^-$ and compute the gradient matrix $H_k(\hat{x}_k^-) = \dfrac{\partial C}{\partial x}\bigg|_{x=\hat{x}_k^-}$
5. Kalman gain $K_k = P_k^{-1} H_k^T(\hat{x}_k^-)[H_k(\hat{x}_k^-) P_k^- H_k^T(\hat{x}_k^-) + R_k]^{-1}$
6. Parameter association: Using the propagated state computed the predicted values of the measurement and apply Hungarian algorithm to find the likely observations in the new frame
7. Kalman update: Update the propagated state and the co-variance matrix as
   $\hat{X}_k^+ = \hat{X}_k^- + K_k[y_k - C(\hat{X}_k^-)]$, $P_k^+ = [I - K_k H_k^T(\hat{X}_k^-)] P_k^-$
8. until The association fails to find a valid parameters for few of the new consecutive frames

---

In one embodiment, convergence of the filter takes a few frames (on the order of tens of milliseconds). After this point, the filter constantly updates its estimates of velocity and direction of motion. Reconstructing the motion is now akin to starting with the initial point and performing a directional piece-wise integration using the velocity and direction of motion parameter at each time step as described in Algorithm 2.

As explained before, some motions, such as a human motion, cannot be considered a single object moving. For example, when a hand moves it involves the movement of the forearm and the shoulder in a coordinated fashion. Each of these body parts could be producing their own backscatter components and the above algorithm will trace two or more different motion paths for them. One embodiment determines whether or not different motion paths arose from a single object. It is noted that if there are set of connected motions as described above, there is a clear geometrical relationship between them. The intuition is that the shape of the motion traces for these connected objects is very similar, they might just be shifted and scaled as shown in FIGS. 10A and 10B. The precise mathematical relationship between these traces is that every point on the trace is a scaled and shifted version of the corresponding point in the other trace. Therefore, corresponding points in the two traces have an affine relationship.

FIGS. 10A and 10B illustrate an example movement of a person's hand 1002, according to one embodiment of the present invention. As illustrated, when hand 1002 moves, multiple parts of the hand move in a coordinated fashion. For example, in FIG. 10A, the elbow point 1004 performs a similar trajectory to that performed by hand 1002. However, it is a scaled and shifted version of the trajectory performed by hand, and the same is reflected in the tracing by the Kalman filter, illustrated in FIG. 10B. Moreover, there may be multiple copies of the signal received at the system due to indirect reflections, which also result in translated versions of the trajectory of hand.

In one embodiment, a spectral clustering algorithm called sub-space clustering algorithm (SSC) is used in motion segmentation block 516, as illustrated in FIG. 5, to combine motions that are affinity related to each other. The idea is to cluster all motion traces together which exhibit an affine relationship between them. The basic metric in adding a trace to a cluster is whether or not the trace can be written as a linear combination of other traces already in the cluster plus a constant. The algorithms automatically finds the number of clusters to use. An outcome of this step is a set of clusters and motion traces in each cluster. The number of clusters represents the number of moving objects in the environment. The traces in each cluster are normalized to show the overall motion trace for each object in the environment. As illustrated in FIG. 10B, there are two different clusters 1006 and 1008, each corresponding to a different moving object. For example, cluster 1006 corresponds to the movement of the hand 1002 and elbow 1004 as illustrated in FIG. 10A.

Figure 11:
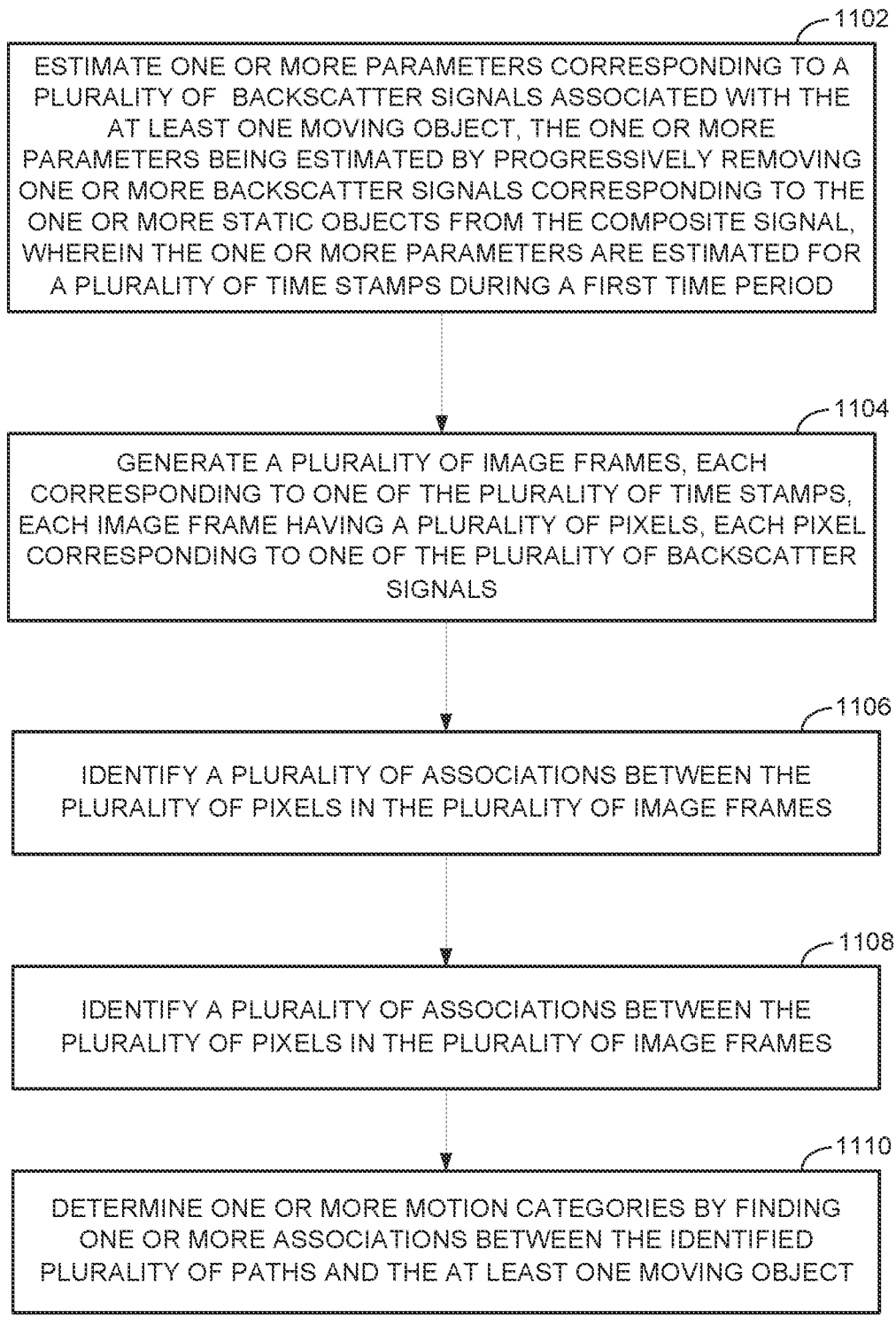
FIG. 11 illustrates example operations that may be performed by a device to detect motion, in accordance with one embodiment of the present disclosure.

FIG. 11 illustrates example operations that may be performed by a device to detect motion, in accordance with one embodiment of the present disclosure. In one embodiment, the device is a radio frequency transceiver. At 1102, the device estimates one or more parameters corresponding to a plurality of backscatter signals corresponding to at least one moving object. The one or more parameters are estimated by progressively removing one or more backscatter signals corresponding to the one or more static objects from the composite signal. The device may estimate the one or more parameters for a plurality of time stamps during a first time period. At 1104, the device generates a plurality of image frames corresponding to one of the plurality of time stamps. Each image frame has a plurality of pixels, each pixel corresponding to one of the plurality of backscatter signals. At 1106, the device identifies a plurality of associations between the plurality of pixels in the plurality of image frames. At 1108, the device identifies a plurality of paths corresponding to the at least one moving object in accordance with the plurality of associations. At 1110, the device determines one or more motion categories by finding one or more associations between the identified plurality of paths and the at least one moving object. The device may then trace motion of the detected moving object.

Figure 12:
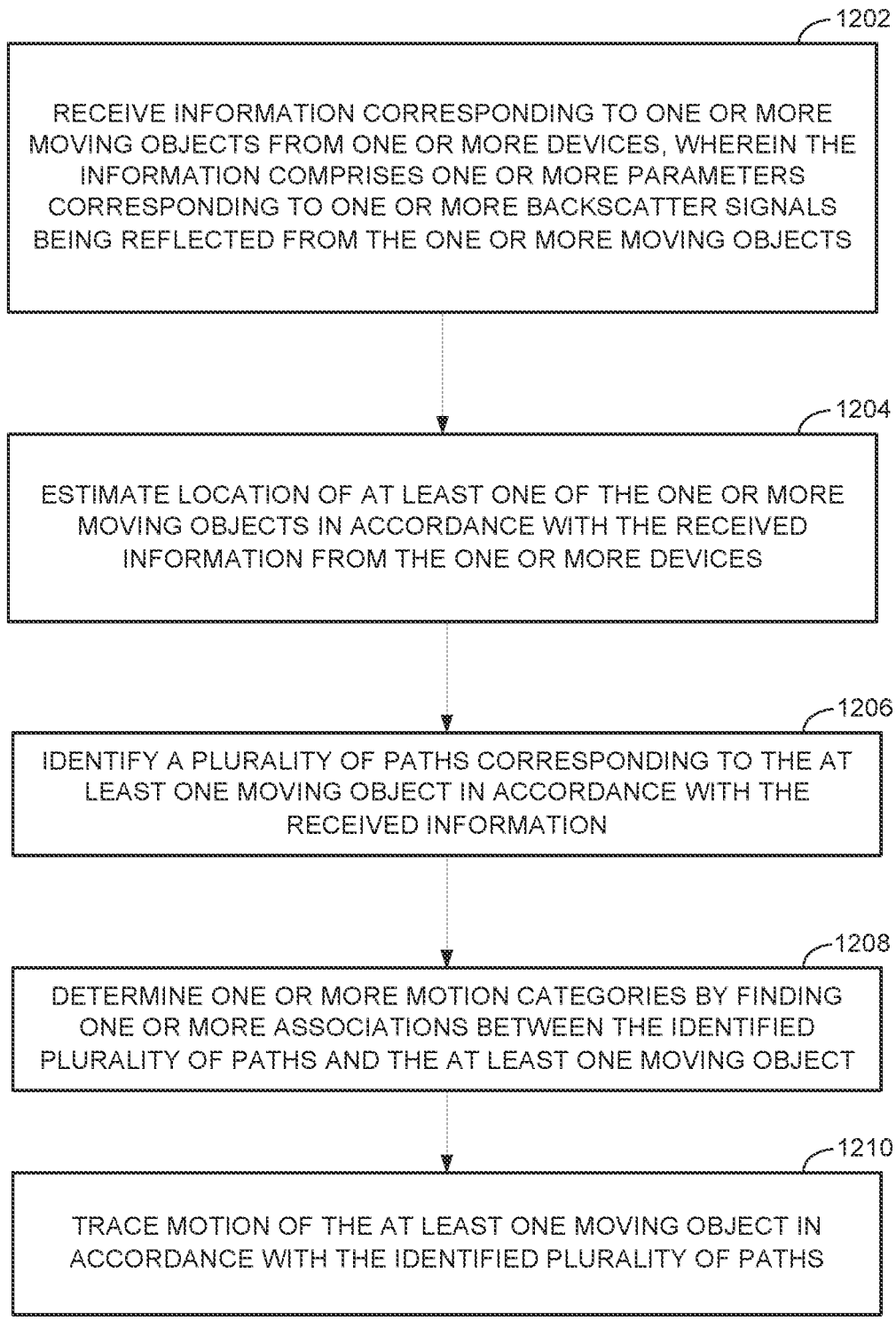
FIG. 12 illustrates example operations that may be performed by a device to trace motion of a moving device, in accordance with one embodiment of the present disclosure.

FIG. 12 illustrates example operations that may be performed by a device to trace motion, in accordance with one embodiment of the present disclosure. In general, the device may be a stand-alone server or a transceiver capable of processing information. At 1202, the device receives information corresponding to one or more moving objects from one or more devices (e.g., transceivers). The information includes one or more parameters corresponding to one or more backscatter signals being reflected from the one or more moving objects. At 1204, the device estimates location of at least one of the one or more moving objects in accordance with the received information from the one or more devices. At 1206, the device identifies a plurality of paths corresponding to the at least one moving object in accordance with the received information. At 1208, the device determines one or more motion categories by finding one or more associations between the identified plurality of paths and the at least one moving object. At 1210, the device determines a number of moving objects corresponding to the number of motion categories. At 1212, the device traces motion of the at least one moving object in accordance with the identified plurality of paths and/or the motion categories.

Figure 13:
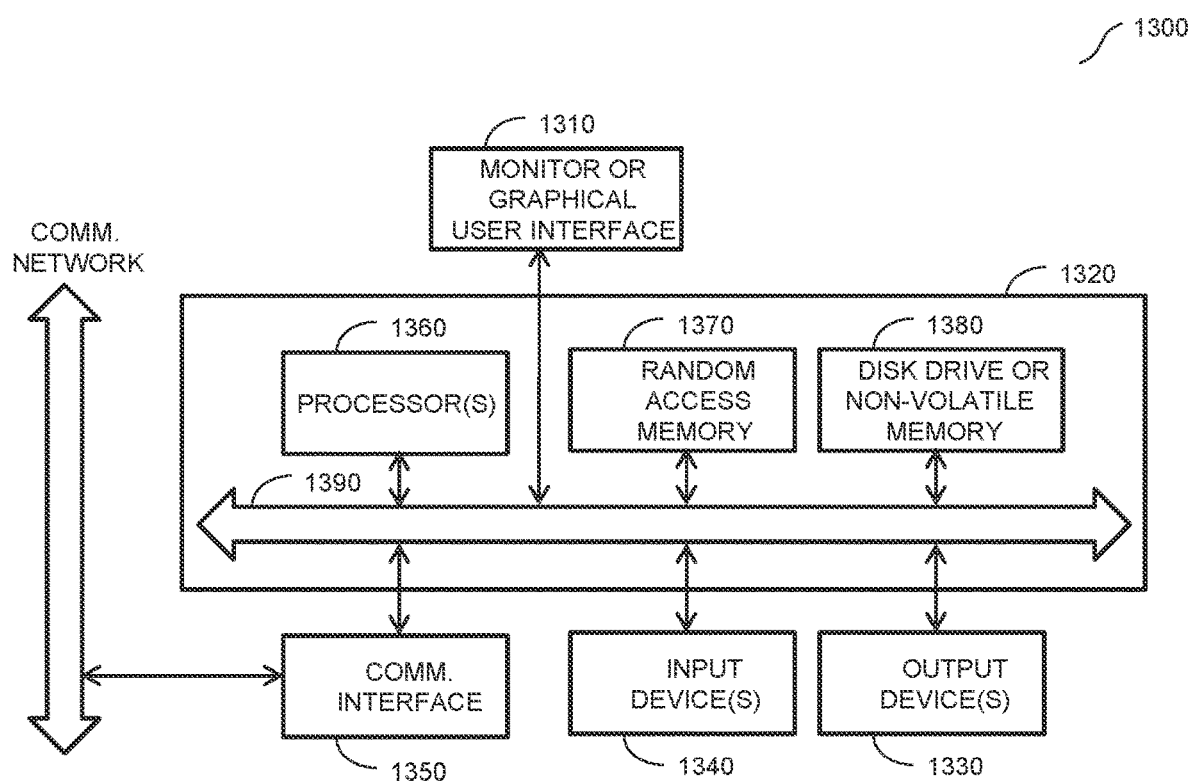
FIG. 13 is a simplified block diagram of an exemplary computer or data processing system 1300 in which portions of the motion tracing/detection device, may be embodied.

FIG. 13 is a simplified block diagram of an exemplary computer or data processing system 1300 in which portions of the motion tracing/detection device, may be embodied. Computer system 1300 is shown as including a monitor 1310, a computer 1320, user output devices 1330, user input devices 1340, communications interface 1350, and the like.

As shown in FIG. 13, computer 1320 may include one or more processors or processing units 1360 that communicates with a number of peripheral devices via a bus subsystem 1390. These peripheral devices may include user output devices 1330, user input devices 1340, communications interface 1350, and a storage subsystem, such as random access memory (RAM) 1370 and non-volatile memory 1380.

User input devices 1330 include all possible types of devices and mechanisms for inputting information to computer system 1320. These may include a keyboard, a keypad, a touch screen incorporated into the display, audio input devices such as voice recognition systems, microphones, and other types of input devices. User input devices 1330 typically allow a user to select objects, icons, text and the like that appear on the monitor 1310 via a command such as a click of a button or the like. User output devices 1340 include all possible types of devices and mechanisms for outputting information from computer 1320. These may include a display (e.g., monitor 1310), non-visual displays such as audio output devices, etc.

Communications interface 1350 provides an interface to other communication networks and devices. Communications interface 1350 may serve as an interface for receiving data from and transmitting data to other systems. For example, the communication interface 1350 may transmit radio frequency signals and/or information corresponding to the backscatter signals, and receive composite receive signal and/or other information. In various embodiments, computer system 1300 may also include software that enables communications over a network.

RAM 1370 and disk drive 1380 are examples of tangible media configured to store data including, for example, executable computer code, human readable code, or the like. Other types of tangible media include floppy disks, removable hard disks, semiconductor memories such as flash memories, non-transitory read-only-memories (ROMS), battery-backed volatile memories, and the like. RAM 1370 and non-volatile memory 1380 may be configured to store the basic programming and data constructs that provide the functionality described above in accordance with embodiments of the present invention. For example, the memory stores instruction o for detecting and tracing motion, according to one embodiment. Software code modules and instructions that provide such functionality may be stored in RAM 1370 and/or non-volatile memory 1380. These software modules may be executed by processor(s) 1360. RAM 1370 and non-volatile memory 1380 may also provide a repository for storing data used in accordance with embodiments of the present invention.

RAM 1370 and non-volatile memory 1380 may include a number of memories including a main random access memory (RAM) for storage of instructions and data during program execution and a read only memory (ROM) in which fixed non-transitory instructions are stored. RAM 1370 and non-volatile memory 1380 may include a file storage subsystem providing persistent (non-volatile) storage for program and data files. RAM 1370 and non-volatile memory 1380 may also include removable storage systems, such as removable flash memory.

Bus subsystem 1390 provides a mechanism for enabling the various components and subsystems of computer 1320 communicate with each other as intended. Although bus subsystem 1390 is shown schematically as a single bus, alternative embodiments of the bus subsystem may utilize multiple busses.

Various embodiments of the present invention may be implemented in the form of logic in software or hardware or a combination of both. The logic may be stored in a computer readable or machine-readable non-transitory storage medium as a set of instructions adapted to direct a processor of a computer system to perform the functions described above in accordance with embodiments of the present invention. Such logic may form part of a computer adapted to direct an information-processing device to perform the functions described above.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices or other media, now known or later developed, that are capable of storing code and/or data. Various circuit blocks of the embodiments of the present invention described above may be disposed in an application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above descriptions of embodiments of the present invention are illustrative and not limitative. For example, the various embodiments of the present inventions are not limited to the use antennas, transmit and/or receive chain elements, cancellation circuits, radio frequency transceivers, transceivers, digital to analog converters, analog to digital converters. Other modifications and variations will be apparent to those skilled in the art and are intended to fall within the scope of the appended claims.

What is claimed is:

1. A method for detecting motion in an environment, comprising:
   transmitting a radio frequency signal;
   receiving a composite signal comprising a plurality of backscatter signals corresponding to reflections of the radio frequency signal from at least one moving object and one or more static objects;
   estimating a signal strength and a delay associated with each of the plurality of backscatter signals;
   determining the backscatter signals associated with the static objects using the estimated signal strengths and estimated delays;
   removing the backscatter signals associated with the static objects from the composite signal progressively to determine the backscatter signal associated with the moving object; and
   detecting the at least one moving object from the backscatter signal associated with the moving object.

2. The method of claim 1, wherein the one or more parameters are estimated for a plurality of time stamps during a first time period, the method further comprising:
   generating a plurality of image frames, each corresponding to one of the plurality of time stamps, each image frame having a plurality of pixels, each pixel corresponding to one of the plurality of backscatter signals; and
   identifying a plurality of associations between the plurality of pixels in the plurality of image frames.

3. The method of claim 2, further comprising:
   identifying a plurality of paths corresponding to the at least one moving object in accordance with the plurality of associations.

4. The method of claim 3, further comprising:
   determining one or more motion categories by finding one or more associations between the identified plurality of paths and the at least one moving object; and
   determining a number of moving objects corresponding to the number of motion categories.

5. The method of claim 2, wherein the plurality of associations between the plurality of pixels in the plurality of image frames are identified by performing a Hungarian Algorithm.

6. The method of claim 1, wherein the one or more parameters correspond to one or more of an angle of arrival of a backscatter signal at a receiver, attenuation, and delay since the radio frequency signal was transmitted.

7. The method of claim 1, wherein the composite signal comprises a first portion received from a first antenna and a second portion received from a second antenna different from the first antenna, and the one or more parameters corresponding to the plurality of backscatter signals are estimated based at least on a difference between the first portion and second portion of the composite signal.

8. The method of claim 1, further comprising:
   transmitting information corresponding to the one or more moving objects to a server; and
   receiving estimated location of the one or more moving objects from the server.

9. An apparatus for detecting motion in an environment, comprising:
   a transmitter;
   one or more receivers;
   a memory; and
   at least one processor coupled to the transmitter, the one or more receivers and the memory, the at least one processor configured to:
   transmit a radio frequency signal;
   receive a composite signal comprising a plurality of backscatter signals, wherein the plurality of the backscatter signals correspond to a reflection of the radio frequency signal from one or more objects in the environment, wherein the one or more objects comprise at least one moving object and one or more static objects;
   estimate a signal strength and a delay associated with each of the plurality of backscatter signals;
   determine the backscatter signals associated with the static objects using the estimated signal strengths and estimated delays;
   remove the backscatter signals associated with the static objects from the composite signal progressively to determine the backscatter signal associated with the moving object; and
   detect the at least one moving object from the backscatter signal associated with the moving object.

10. The apparatus of claim 9, wherein the one or more parameters are estimated for a plurality of time stamps during a first time period, the at least one processor is further configured to:
 generate a plurality of image frames, each corresponding to one of the plurality of time stamps, each image frame having a plurality of pixels, each pixel corresponding to one of the plurality of backscatter signals; and
 identify a plurality of associations between the plurality of pixels in the plurality of image frames.

11. The apparatus of claim 10, wherein the at least one processor is further configured to:
 identify a plurality of paths corresponding to the at least one moving object in accordance with the plurality of associations.

12. The apparatus of claim 11, wherein the at least one processor is further configured to:
 determine one or more motion categories by finding one or more associations between the identified plurality of paths and the at least one moving object; and
 determine a number of moving objects corresponding to the number of motion categories.

13. The apparatus of claim 10, wherein the plurality of associations between the plurality of pixels in the plurality of image frames are identified by performing a Hungarian Algorithm.

14. The apparatus of claim 9, wherein the one or more parameters correspond to one or more of an angle of arrival of a backscatter signal at a receiver, attenuation, and delay since the radio frequency signal was transmitted.

15. The apparatus of claim 9, wherein the composite signal comprises a first portion received from a first antenna and a second portion received from a second antenna different from the first antenna, and the one or more parameters corresponding to the plurality of backscatter signals are estimated based at least on a difference between the first portion and second portion of the composite signal.

16. The apparatus of claim 9, wherein the at least one processor is further configured to:
 transmit information corresponding to the one or more moving objects to a server; and
 receive estimated location of the one or more moving objects from the server.

17. A non-transitory processor-readable medium for detecting motion in an environment, comprising processor-readable instructions configured to cause one or more processors to:
 transmit a radio frequency signal;
 receive a composite signal comprising a plurality of backscatter signals, wherein the plurality of the backscatter signals correspond to a reflection of the radio frequency signal from one or more objects in the environment, wherein the one or more objects comprise at least one moving object and one or more static objects;
 estimate a signal strength and a delay associated with each of the plurality of backscatter signals;
 determine the backscatter signals associated with the static objects using the estimated signal strengths and estimated delays;
 remove the backscatter signals associated with the static objects from the composite signal progressively to determine the backscatter signal associated with the moving object; and
 detect the at least one moving object from the backscatter signal associated with the moving object.

* * * * *